(12) United States Patent
Zhong

(10) Patent No.: US 8,743,287 B2
(45) Date of Patent: Jun. 3, 2014

(54) METHOD AND SYSTEM FOR MITIGATING MOTION TRAIL ARTIFACTS AND IMPROVING LOW CONTRAST CONTOURS IN TEMPORAL FILTERING BASED NOISE REDUCTION

(75) Inventor: Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 729 days.

(21) Appl. No.: 12/539,196

(22) Filed: Aug. 11, 2009

(65) Prior Publication Data

US 2011/0019093 A1 Jan. 27, 2011

Related U.S. Application Data

(60) Provisional application No. 61/228,417, filed on Jul. 24, 2009.

(51) Int. Cl.
*H04N 5/00* (2006.01)

(52) U.S. Cl.
USPC .......................................... 348/620; 348/619

(58) Field of Classification Search
USPC ......... 348/607, 701, 618–620, 584–600, 452; 375/240.16, 240.29
See application file for complete search history.

(56) References Cited

U.S. PATENT DOCUMENTS

| | | | |
|---|---|---|---|
| 2007/0069980 A1* | 3/2007 | MacInnis | 345/58 |
| 2007/0139560 A1* | 6/2007 | Zhong | 348/584 |
| 2007/0139568 A1* | 6/2007 | Zhong et al. | 348/701 |
| 2008/0062327 A1* | 3/2008 | MacInnis et al. | 348/701 |
| 2008/0063064 A1* | 3/2008 | MacInnis et al. | 375/240.16 |
| 2008/0101469 A1* | 5/2008 | Ishtiaq et al. | 375/240.13 |
| 2009/0016451 A1* | 1/2009 | Chen | 375/240.29 |

* cited by examiner

*Primary Examiner* — Michael Lee
(74) *Attorney, Agent, or Firm* — Foley & Lardner LLP; Christopher J. McKenna; Daniel Rose

(57) ABSTRACT

Current output pictures of video data are generated utilizing a motion compensated (MC) blended picture and a corresponding non-MC blended picture of the video data. Windows of picture data from a first picture and MC windows of picture data from a MC previously output picture may be partitioned. The partitioned widows are compared and the first picture is blended with the MC previously output picture based on the comparison to, for example, reduce noise and prevent motion trail artifacts. Non-MC windows of picture data from a MC or non-MC previously output picture may be partitioned and compared with the windows of picture data from the first picture. The first picture may be blended with the MC or non-MC previously output picture based on the comparison to reduce motion trail artifacts. A blending factor is determined and utilized to blend the blended pictures to reduce noise and prevent motion artifacts.

24 Claims, 12 Drawing Sheets

METHOD AND SYSTEM FOR MITIGATING MOTION TRAIL ARTIFACTS AND IMPROVING LOW CONTRAST CONTOURS IN TEMPORAL FILTERING BASED NOISE REDUCTION

CROSS-REFERENCE TO RELATED APPLICATIONS/INCORPORATION BY REFERENCE

This application makes reference to, claims priority to, and claims the benefit of U.S. Provisional Application Ser. No. 61/228,417, filed on Jul. 24, 2009.

This application also makes reference to U.S. application Ser. No. 11/619,444, which was filed on Jan. 3, 2007.

Each of the above referenced applications is hereby incorporated herein by reference in its entirety.

FIELD OF THE INVENTION

Certain embodiments of the invention relate to communications. More specifically, certain embodiments of the invention relate to a method and system for mitigating motion trail artifacts and improving low contrast contours in temporal filtering based noise reduction.

BACKGROUND OF THE INVENTION

Analog video may be received through broadcast, cable, and VCRs. The reception is often corrupted by noise, and therefore to improve the visual quality, noise reduction may be needed. Digital video may be received through broadcast, cable, satellite, Internet, and video discs. Digital video may be corrupted by noise, which may include coding artifacts, and to improve the visual quality, noise reduction may be beneficial. Various noise filters have been utilized in video communication systems such as set top boxes and TVs. However, inaccurate noise characterization, especially during scenes with motion, may result in artifacts caused by the filtering, which are more visually detrimental than the original noise.

In video system applications, random noise present in video signals, such as NTSC or PAL analog signals, for example, may result in images that are less than visually pleasing to the viewer. To address this problem, noise reduction (NR) operations may be utilized to remove or mitigate the noise present.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for mitigating motion trail artifacts and improving low contrast contours in temporal filtering based noise reduction, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
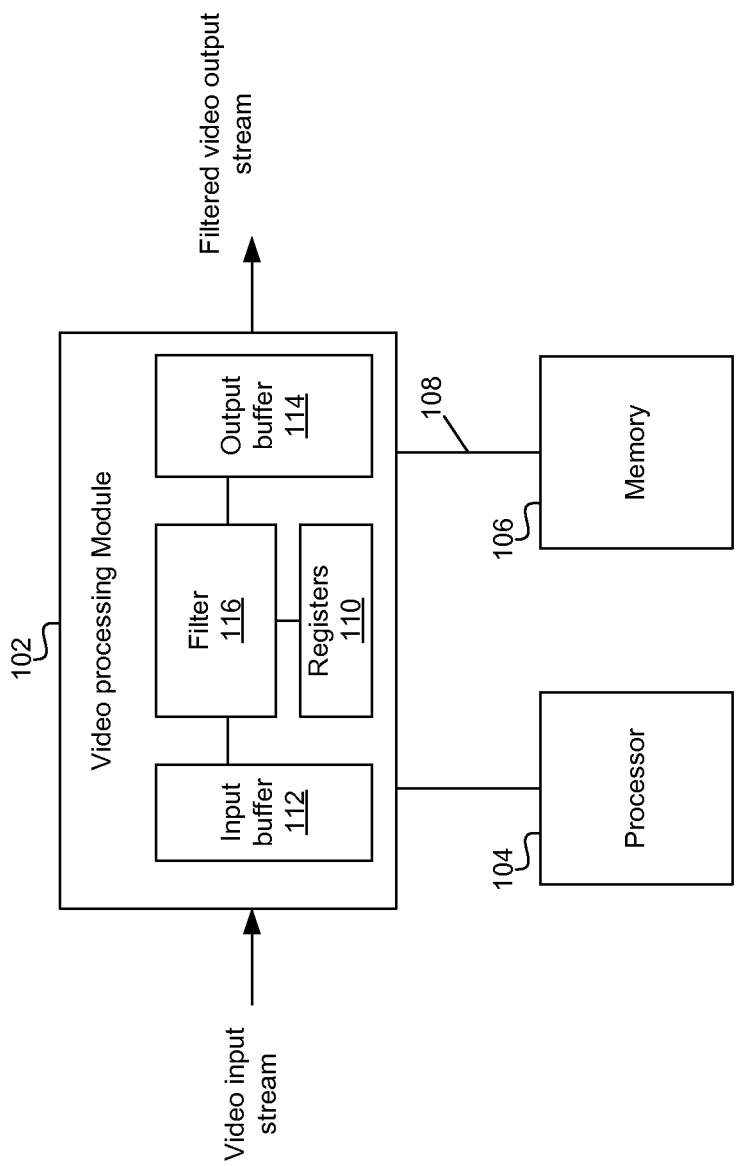
FIG. 1 is a block diagram of an exemplary video noise reduction system, in accordance with an embodiment of the invention.

Certain embodiments of the invention may be found in a system and/or method for mitigating motion trail artifacts and improving low contrast contours in temporal filtering based noise reduction. Aspects of the method and/or system may comprise one or more processors and/or circuits that are operable to generate one or more noise reduced current output pictures of video data utilizing a generated motion compensated blended picture of video data and a corresponding generated non-motion compensated blended picture of the video data. In this regard, a motion compensated blended picture of video data may be generated utilizing one or more motion compensated partitioned windows of picture data. Also, a corresponding non-motion compensated blended picture of video data may be generated utilizing one or more non-motion compensated partitioned windows of the picture data. In this regard, one or more of windows of picture data from a first picture of video data and one or more motion compensated windows of picture data from a motion compensated previously generated output picture of video data may be partitioned. The partitioned widows of picture data from the first picture of the video data may be compared with corresponding ones of the partitioned motion compensated windows of picture data from the motion compensated previously generated output picture of video data. During temporal filtering based noise reduction, the first picture of video data may be blended with the motion compensated previously generated output picture of the video data based on the comparison. In this regard, a blending factor may, for example, be shifted based on the comparison. The shifted blending factor may enable a reduction in motion trail artifacts in the blended first picture of video data with the motion compensated previously generated motion compensated output picture of video data in temporal filtering based noise reduction.

Furthermore, during temporal filtering based noise reduction, one or more non-motion compensated windows of picture data from a motion compensated previously generated output picture of the video data may be partitioned. The partitioned widows of picture data from the first picture of video data may be compared with corresponding ones of the partitioned non-motion compensated windows of picture data from the motion compensated previously generated output picture of the video data. In this regard, the first picture of video data may be blended without utilizing motion compensation with the motion compensated previously generated output picture of video data based on the comparison. Accordingly, a blending factor may be shifted based on the comparison. The shifted blending factor may, for example, enable a reduction in motion trail artifacts in the non-motion compensated blended first picture of video data with the motion compensated previously generated output picture of video data.

One or more non-motion compensated windows of picture data from a non-motion compensated previously generated output picture of the video data may be partitioned. The partitioned widows of picture data from the first picture of video data may be compared with corresponding ones of the partitioned windows of picture data from the non-motion compensated previously generated output picture of the video data. In this regard, the first picture of video data may be blended without utilizing motion compensation with the non-motion compensated previously generated output picture of video data based on the comparison. A blending factor may be shifted based on the comparison. The shifted blending factor may, for example, enable a reduction in motion trail artifacts in the non-motion compensated blended first picture of video data with the non-motion compensated previously generated output picture of video data of temporal filtering based noise reduction.

A blending factor may be determined for blending the blended first picture of video data and a corresponding motion compensated previously generated output picture of the video data with the blended first picture of the video data and the non-motion compensated previously generated output picture of the video data. The determined blending factor may be utilized when blending the blended pictures of video data.

FIG. 1 is a block diagram of an exemplary video noise reduction system, in accordance with an embodiment of the invention. Referring to FIG. 1, there is shown a video processing block 102, a processor 104, a memory 106, and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pixels in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform an IIR filtering operation with noise reduction (IIR-NR) on the current pixel. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. One or more of the blending factors may be adjusted to reduce unwanted video processing effects. For example, motion trails and/or smearing distortions that may be artifacts of excessive filtering of images comprising low contrast contours, for example, images comprising areas of flesh tones in a human face, may be reduced. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108. The memory 106 may comprise suitable logic, circuitry, and/or code that may be enabled to store information that may be utilized by the video processing block 102 to reduce noise in the video input stream. The processor 104 may also be enabled to determine noise levels for a current video picture based on an early-exit algorithm (EEA) or an interpolation estimate algorithm (IEA), for example. The memory 106 may be enabled to store filter coefficients, threshold levels, and/or constants, for example, to be utilized by the video processing block 102. U.S. application Ser. No. 11/313,592 filed Dec. 20, 2005, provides a detailed description of the early-exit algorithm (EEA) and the interpolation estimate algorithm (IEA), and is hereby incorporated by reference in its entirety.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

Figure 2:
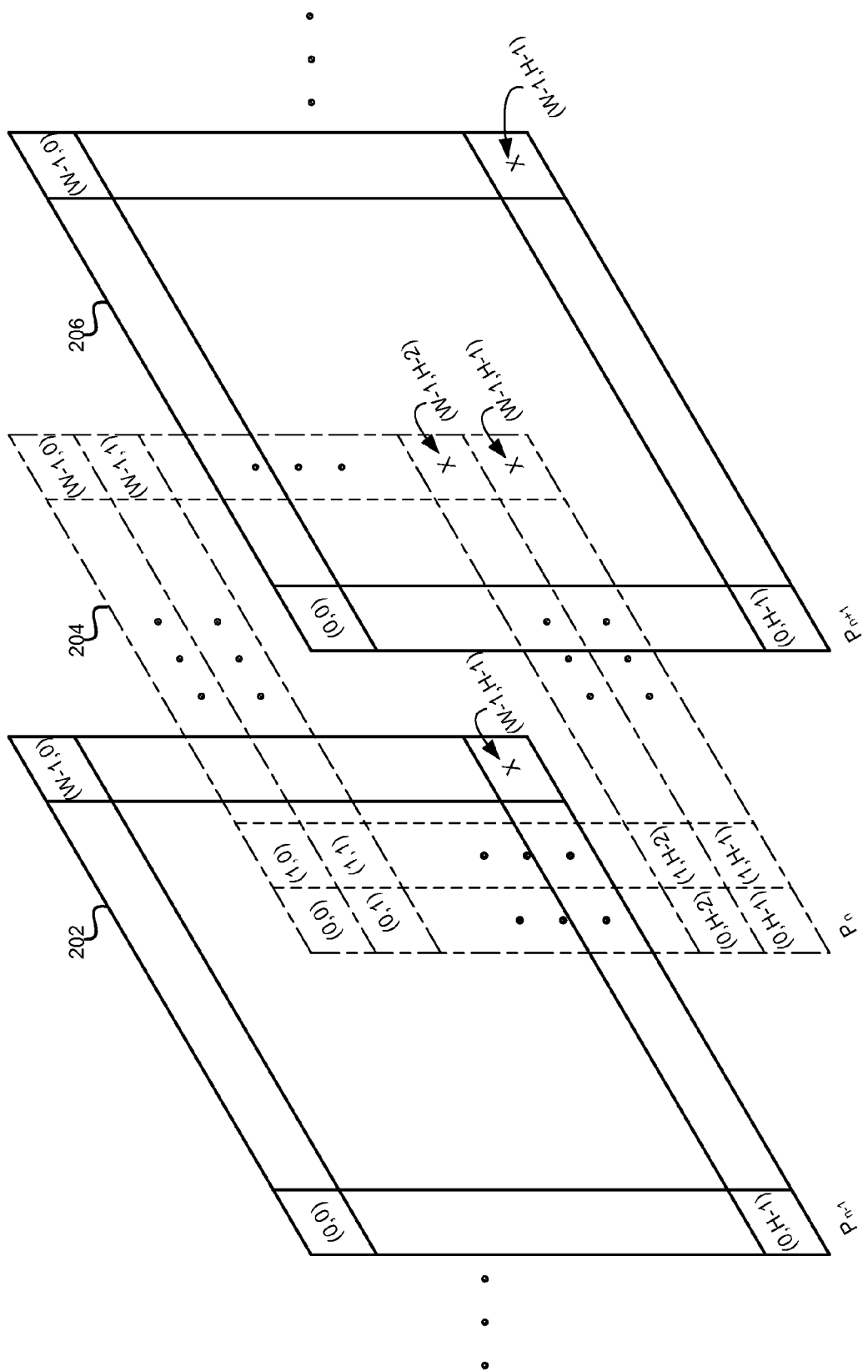
FIG. 2 is a diagram illustrating exemplary consecutive video pictures for noise reduction operations, in connection with an embodiment of the invention.

FIG. 2 is a diagram illustrating exemplary consecutive video pictures for noise reduction operations, in connection with an embodiment of the invention. Referring to FIG. 2, there is shown a current video picture 204, a previous video picture 202, and a next video picture 206. The current video picture 204 or PICTURE n may correspond to a current picture being processed by the video processing block 102 in FIG. 1. The previous video picture 202 or PICTURE (n−1) may correspond to an immediately previous picture to the current video picture 204. The next video picture 206 or PICTURE (n+1) may correspond to an immediately next picture to the current video picture 204. The previous video picture 202, the current video picture 204, and/or the next video picture 206 may be processed directly from the video input stream or after being buffered in the video processing block 102, for example. The current video picture 204, the previous video picture 206, and the next video picture 208 may comprise luma (Y) and/or chroma (Cb, Cr) information. In embodiments where video fields are utilized as pictures, the previous video picture 202 may refer to the previous field of the same parity as the current video picture 204, and the next video picture 206 may refer to the next field of the same parity as the current picture 204. The previous, current and next video fields of the same parity may be referred to as consecutive video pictures.

Pixels in consecutive video pictures are said to be collocated when having the same picture location, that is, . . . , $P_{n-1}(x,y), P_n(x,y), P_{n+1}(x,y), \ldots$, where $P_{n-1}$ indicates a pixel value in the previous video picture 202, $P_n$ indicates a pixel value in the current video picture 204, $P_{n+1}$ indicates a pixel value in the next video picture 206, and (x,y) is the common picture location between pixels. As shown in FIG. 2, for the picture location, (x,y) is such that x=0, 1, . . . , W−1 and y=0, 1, . . . , H−1, where W is the picture width and H is the picture height, for example.

Operations of the video processing block 102 in FIG. 1 need not be limited to the use of exemplary consecutive video pictures as illustrated in FIG. 2. For example, the video processing block 102 may perform filtering operations on consecutive video fields of the same parity, that is, on consecutive top fields or consecutive bottom fields. When performing noise reduction operations on consecutive video fields of the same parity, pixels in the video processing block 102 are said to be collocated when having the same picture location, that is, . . . , $P_{n-1}(x,y), P_n(x,y), P_{n+1}(x,y), \ldots$, where $P_{n-1}$ indicates a pixel value in a previous video field, $P_n$ indicates a pixel value in a current video field, $P_{n+1}$ indicates a pixel value in a next video field, and (x,y) is the common picture location between pixels.

Figure 3:
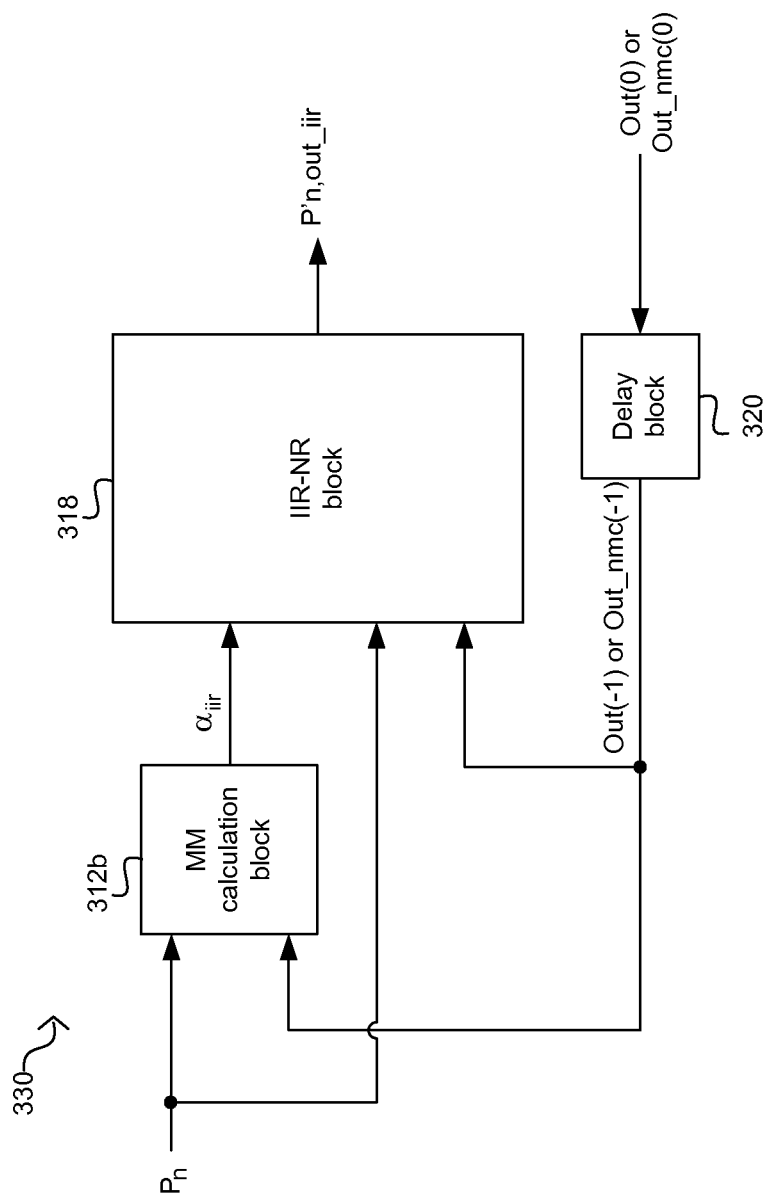
FIG. 3 is a block diagram of an exemplary infinite impulse response (IIR) filtering system with noise reduction, in accordance with an embodiment of the invention.

FIG. 3 is a block diagram of an exemplary infinite impulse response (IIR) filtering system with noise reduction, in accordance with an embodiment of the invention. Referring to FIG. 3, there is shown an IIR filtering system 330 that may comprise an MM (motion metric) calculation block 312b, an IIR noise reduction (IIR-NR) block 318, and a delay block 320. The IIR filtering system 330 may be implemented as a portion of the video processing block 102 in FIG. 1, for example. The MM calculation block 312b may comprise suitable logic, circuitry, and/or code that may be enabled to determine a motion metric (MM) parameter based on contents from a current pixel, $P_n$, and from a previously generated output picture Out(−1) or a previously generated non-MC output signal Out_nmc(−1). The MM calculation block 312b may utilize the MM parameter to determine an IIR blending factor, $\alpha_{iir}$. The IIR blending factor, $\alpha_{iir}$, may be determined by a mapping operation of the motion metric information. This mapping operation may respond rapidly to motion to avoid unnecessary filtering in moving areas, for example.

The IIR-NR block 318 may comprise suitable logic, circuitry, and/or code that may be enabled to IIR filter the current pixel, $P_n$. The IIR-NR block 318 may also be enabled to generate an IIR-blended current pixel given by the expression:

$$P'_{n,out\_iir}(x,y)=\alpha_{iir}\cdot P_n(x,y)+(1-\alpha_{iir})\cdot \text{Out}(-1), \quad (3)$$

where the IIR blending factor, $\alpha_{iir}$, controls the contribution of the previously generated output picture Out(−1) to the IIR-blended current pixel. The delay block 320 may comprise suitable logic, circuitry, and/or code that may be enabled to delay by one video picture the transfer of the recursive feedback from the output of the IIR-NR block 318 to the MM calculation block 312b and to the input of the IIR-NR block 318. In this regard, both the MM calculation block 312b and the IIR-NR block 318 may utilize a recursive feedback operation based on the previously generated output picture Out(−1) or a previously generated non-MC output signal Out_nmc(−1).

In operation, the current pixel, $P_n$, and the previously generated non-MC output signal Out_nmc(−1) may be received by the MM calculation block 312b and the IIR-NR block 318. The MM calculation block 312b may generate the IIR blending factor, $\alpha_{iir}$. The IIR-NR block 318 may IIR filter the current pixel, $P_n$, and may utilize the current pixel and the previously generated output picture Out(−1) to perform the operation described by equation (3).

Motion-adaptive IIR filtering methods may achieve significant noise reduction but may result in artifacts such as motion trails and/or blurring of moving objects. To avoid these motion artifacts, IIR noise reduction operations may be configured conservatively, limiting, in some instances, the ability to reduce noise components.

Figure 4A:
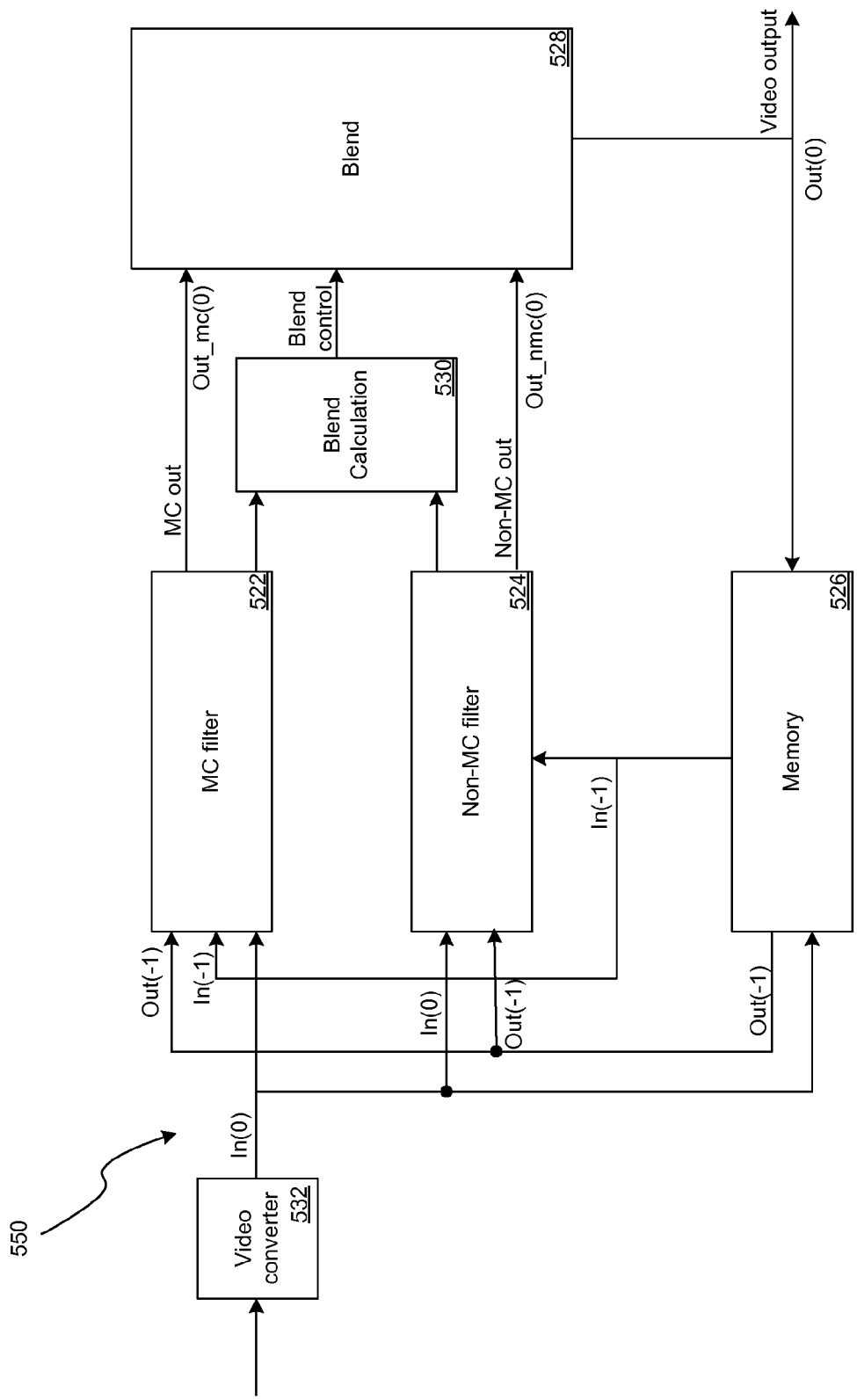
FIG. 4A is a block diagram illustrating exemplary motion compensated temporal filtering system using infinite impulse response (IIR) filtering, in accordance with an embodiment of the invention.

FIG. 4A is a block diagram illustrating an exemplary motion compensated temporal filtering (MCTF) system using infinite impulse response (IIR) filtering, in accordance with an embodiment of the invention. Referring to FIG. 4A, there is shown a MCTF system 550 that comprises a video converter 532, a motion compensated (MC) filter block 522, a non-MC filter block 524, a memory 526, a blend calculation block 530, and a blend block 528.

The video converter 532 may comprise suitable logic, circuitry and/or code that may be enabled to receive video data from a video source in YCbCr 4:2:2 format, for example. The video converter 532 may be enabled to convert the received video data to YCbCr in the 4:4:4 format before motion estimation and motion compensation operations are performed to facilitate motion estimation and motion compensation of chroma components. The chroma samples may be interpolated to the same sample density as the luma samples. The 4:2:2 to 4:4:4 interpolation may utilize a 4-tap filter, for example. The even indexed 4:4:4 chroma pixels may be generated from the half-value indexed 4:2:2 chroma samples. The odd indexed 4:4:4 chroma samples may be interpolated using four 4:2:2 chroma samples, for example, two to the left and two to the right of the current position.

The MC filter block 522 may comprise suitable logic, circuitry and/or code that may be enabled to perform motion compensation, motion estimation, and temporal filtering operation on the incoming video data. The MC filter block 522 may be enabled to receive a previous input picture In(−1), a previous output picture Out(−1) from memory 526, and a current input picture In(0) from the video converter 532. The MC filter block 522 may be enabled to utilize the received previous input picture In(−1), a previous output picture Out(−1) from memory 526, and a current input picture In(0) from the video converter 532 to generate a current output signal Out_mc(0) to the blend block 518 and the blend calculation block 520.

The non-MC filter block 524 may comprise suitable logic, circuitry and/or code that may be enabled to perform motion adaptive temporal filtering (MATF). The non-MC filter block 524 may comprise an IIR filter. The non-MC filter block 524 may be enabled to receive a current input picture In(0) from the video converter 532. The non-MC filter block 524 may be enabled to receive the previous input picture In(−1), and a previous output picture Out(−1) from the memory 526. The previous output picture Out(−1) may be recursively fed back to the non-MC filter block 524. The non-MC filter block 524 may be enabled to utilize the received previous input picture In(−1), a previous output picture Out(−1), and a current input picture In(0) to generate an output signal Out_nmc(0) to the blend block 528 and the blend calculation block 530.

The memory 526 may comprise suitable logic, circuitry, and/or code that may be enabled to store at least a portion of consecutive video pictures. The memory 526 may be enabled to store a previous input picture In(−1), and a previous output picture Out(−1). The memory 526 may be enabled to receive a current input picture In(0) from the video converter 532, and a current output picture Out(0) from the blend block 528.

The blend calculation block 530 may comprise suitable logic, circuitry and/or code that may be enabled to receive the output signals generated from the MC filter block 522 and the non-MC filter block 524 and generate a blend control signal to the blend block 528. The blend calculation block 530 may be enabled to blend together the 4:2:2 outputs of the MC filter block 522 and the non-MC filter block 524. The blend calculation block 530 may be enabled to generate a blend control variable that may represent the confidence metric that a MV may represent the motion of the content at the current pixel In(0). The MV selected for the MC operation may be referred to as MV#0, or the MV with the lowest measured cost.

The blend calculation block 530 may be enabled to estimate the confidence metric of MV#0 by utilizing a combination of three metrics. For example, a first metric (cost_MV#1−cost_MV#0), which indicates how better MV#0 is than the next lowest cost MV, or MV#1, a second metric (cost_zero_MV−cost_MV#0), which indicates how much better MV#0 is compared to the zero (0,0) vector, and a third metric may be the horizontal edge strength, edge_strength_adj. These three metrics may be combined as indicated by the following expressions:

$$\text{confidence\_}mv = \max((\text{cost\_zero\_}MV - \text{cost\_}MV\#0), (\text{cost\_}MV\#1 - \text{cost\_}MV\#0)) \quad (11a)$$

$$\text{confidence} = \max(0, \text{confidence\_}mv - \text{edge\_strength\_adj}) \quad (11b)$$

The value of MV#1 may not affect the result except when MV#0 is the zero MV, since for other cases of MV#0, (cost_zero_MV>=cost_MV#1) and (cost_zero_MV−cost_MV#0)>=(cost_MV#1−cost_MV#0). Therefore, the MV#1 may not be calculated except when MV#0=zero_MV. The motion estimation (ME) may be performed once for every non-overlapping pixel block of size 3×1, for example. For the 3 pixels in the pixel block (of 3×1), MV#0, MV#1 and the (0,0)-MV may be equal. The edge_strength_adj value may be computed once for every 3×1 pixel block, for example, and the same confidence value may be utilized for blending each of the 3 pixels in the pixel block. The confidence value may be processed through a non-linearity to generate a blending control variable blend_MC_NonMC. The non-linearity may be in the form of K4*(1−K5/(d*d)), where d=4*confidence/(size of window), for example, and K4 and K5 are parameters that may be set according to a degree of filtering corresponding to a noise level of an input video and/or the expectations of a subsequent encoder.

The blend block 528 may comprise suitable logic, circuitry and/or code that may be enabled to receive a plurality of input signals: a MC out signal (Out_mc(0)), a blend control signal from the blend calculation block 530, and a non-MC out signal (Out_nmc(0)) from the non-MC filter block 524. The blend block may be enabled to generate a current output picture Out(0) utilizing the received signals: a MC out signal (Out_mc(0)), a blend control signal from the blend calculation block 530, and a non-MC out signal (Out_nmc(0)).

The output of the blend block 528 may be generated by blending the outputs of the MC filter block 522 (Out_mc(0)), and the output of the non-MC filter block 524 (Out_nmc(0)) as follows:

$$\text{Out}(0) = (\text{blend}_{mc\_nonmc} * \text{Out\_}mc(0) + (256 - \text{blend}_{mc\_nonmc}) * \text{Out\_}nmc(0) + 128)/256 \quad (12)$$

The blending factor $\text{blend}_{mc\_nonmc}$ may be utilized for the three luma pixels in a 3×1 block, for example. The chroma blending may be performed for the 4:2:2 format or the even indexed chroma samples may be blended.

The blending factor for the non-MC path and the MC path including non-linearities may be calculated based on the following expressions:

$$m = \frac{4 * \text{confidence}}{\text{me\_window\_size\_w} * \text{me\_window\_size\_h}} \quad (13a)$$

$$\text{blend}_{mc\_nonmc} = K_{mc\_nonmc,0}\left(1 - \frac{K_{mc\_nonmc,1}}{m^2}\right) \quad (13b)$$

$$\text{blend}_{mc\_nonmc} = \text{clip3}(\text{blend}_{mc\_nonmc}, 0, 256) \quad (13c)$$

where $K_{mc\_nonmc,0}$ and $K_{mc\_nonmc,1}$ are parameters that may be set according to the desired degree of filtering corresponding to the noise level of the input video and/or the expectations of a subsequent encoder and the function clip3( ) may be defined as follows:

```
int clip3(int x, int y, int z)
{
        if(x<y) return y;
        else if(x>z) return z;
        else return x;
}
```

Combining equations (11b) and (13a), the normalized confidence value may be approximated based on the following expression:

$$m >> \max(0, (a_0*(\text{confidence\_}mv-\text{edge\_strength\_}adj)) >> 10) \quad (13d)$$

where $$a_0 = ((4*1024)/(\text{me\_window\_size\_}w * \text{me\_window\_size\_}h)) \quad (13e)$$

In the above implementation, $a_0$ may be a programmable unsigned integer value, for example, since the window size may be programmable. The constants in equations (13d) and (13e) may be set to facilitate fixed point operations; they are not a restriction for the invention.

Figure 4B:
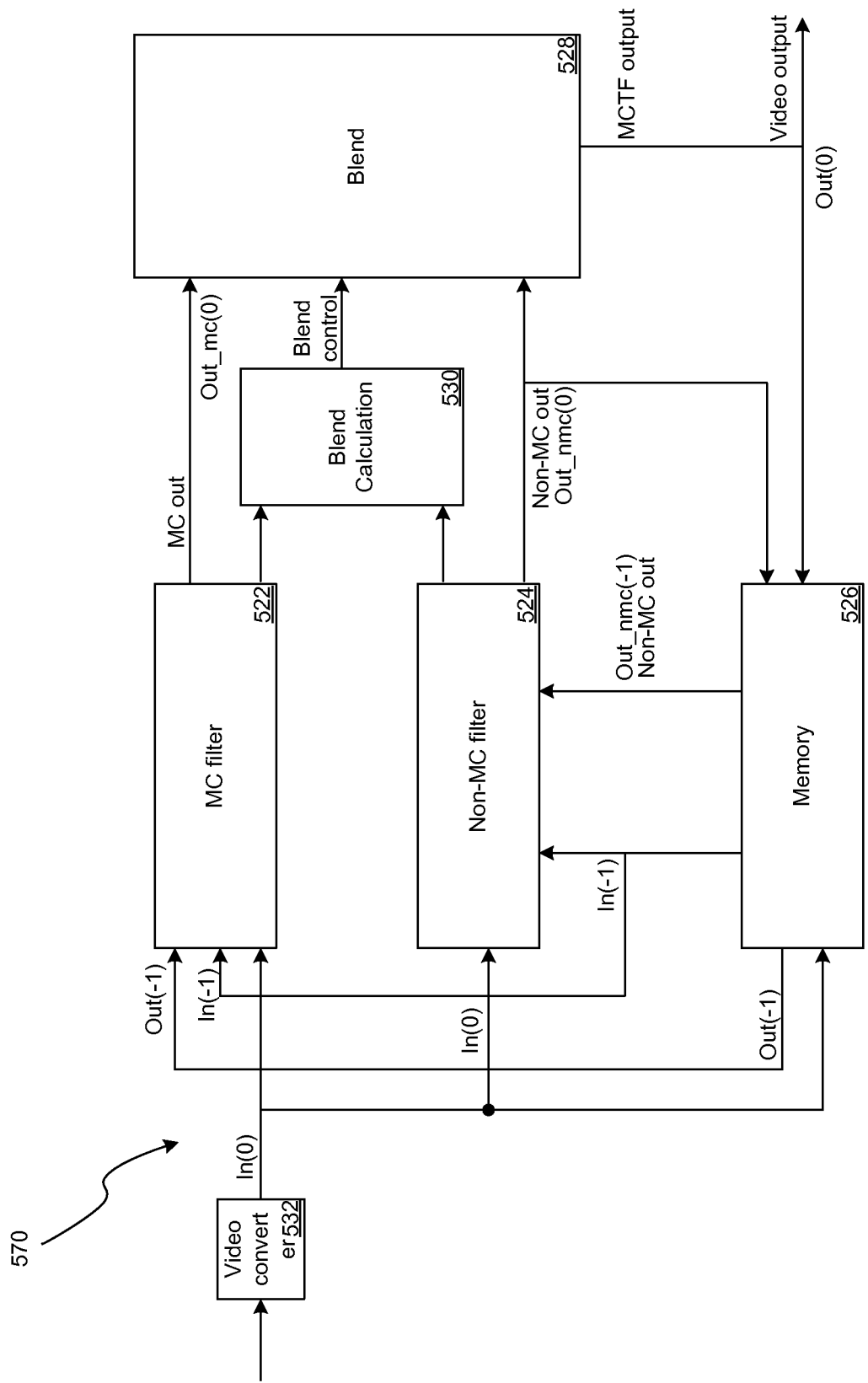
FIG. 4B is a block diagram of an alternative embodiment illustrating exemplary motion compensated temporal filtering system using infinite impulse response (IIR) filtering, in accordance with an embodiment of the invention.

FIG. 4B is a block diagram of an alternative embodiment illustrating exemplary motion compensated temporal filtering system using infinite impulse response (IIR) filtering, in accordance with an embodiment of the invention. Referring to FIG. 4B, there is shown a MCTF system 570 that comprises a video converter 532, a motion compensated (MC) filter block 522, a non-MC filter block 524, a memory 526, a blend calculation block 530, and a blend block 528. The various blocks in FIG. 4B may be substantially as described in FIG. 4A.

The non-MC path block 524 may be enabled to receive a current input picture In(0) from the video converter 532. The non-MC path block 524 may be enabled to receive the previous input picture In(-1), and a previous non-MC output signal (Out_nmc(-1)) from the memory 526. The previous non-MC output signal (Out_nmc(-1)) may be recursively fed back to the non-MC filter block 522. The memory bandwidth utilized by this embodiment may be higher than the bandwidth utilized by the system of FIG. 4A. The non-MC filter block 524 may be enabled to utilize the received previous input picture In(-1), a previous non-MC output signal (Out_nmc(-1)), and a current input picture In(0) to generate an output signal Out_nmc(0) to the blend block 528 and the blend calculation block 530.

The memory 526 may be enabled to store a previous input picture In(-1), a previous output picture Out(-1), and a previous non MC output signal (Out_nmc(-1)). The memory 526 may be enabled to receive a current input picture In(0) from the video converter 532, a current non-MC output signal (Out_nmc(0)) and a current output picture Out(0) from the blend block 528.

Figure 4C:
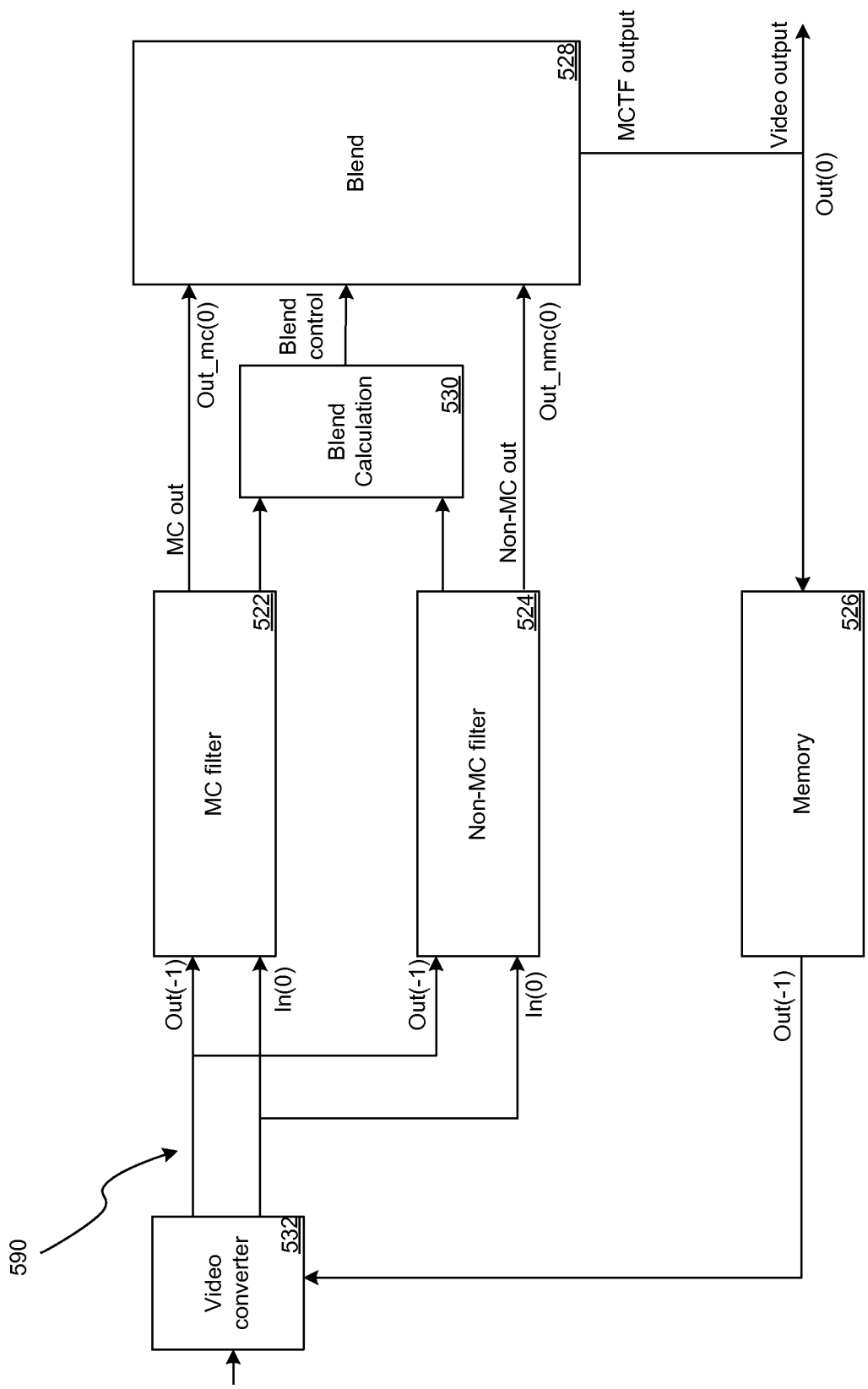
FIG. 4C is a block diagram of another embodiment illustrating exemplary motion compensated temporal filtering system using infinite impulse response (IIR) filtering, in accordance with an embodiment of the invention.

FIG. 4C is a block diagram of another embodiment illustrating exemplary motion compensated temporal filtering system using infinite impulse response (IIR) filtering, in accordance with an embodiment of the invention. Referring to FIG. 4C, there is shown a MCTF system 590 that comprises a video converter 532, a motion compensated (MC) filter block 522, a non-MC filter block 524, a memory 526, a blend calculation block 530, and a blend block 528. The various blocks in FIG. 4C may be substantially as described in FIG. 4A.

The non-MC path block 524 may be enabled to receive a current input picture In(0) and a previously generated output picture Out(-1) from the video converter 532. The non-MC filter block 524 may be enabled to utilize the received current input picture In(0), and the previously generated output picture Out(-1) to generate an output signal Out_nmc(0) to the blend block 528 and the blend calculation block 530.

The memory 526 may be enabled to receive a current output picture Out(0) from the blend block 528. The memory 526 may be enabled to store a previously generated output picture Out(-1) and feed back the previously generated output picture Out(-1) to the video converter 532.

Figure 5:
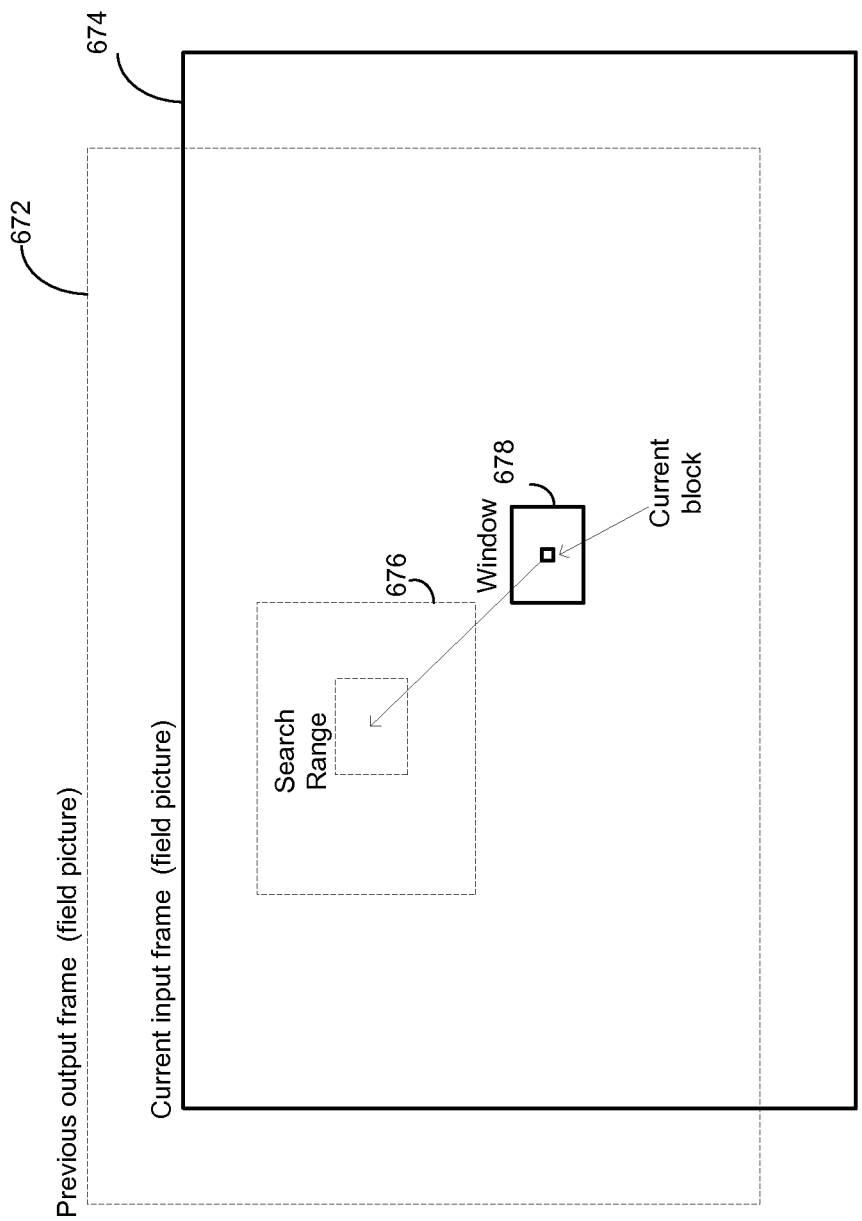
FIG. 5 is an illustration of an exemplary motion estimation method in the motion compensated temporal filtering (MCTF) system for an MC path, in accordance with an embodiment of the invention.

FIG. 5 is an illustration of an exemplary motion compensated temporal filtering (MCTF) system for MC path, in accordance with an embodiment of the invention. Referring to FIG. 5, there is shown a previous output picture Out(-1) 672, a current input picture In(0) 674, a search range block 676, and a window block 678.

In operation, the MC path of the MCTF may perform motion estimation (ME) to determine a motion vector (MV) to represent motion of image content at each current block. The value of a metric representing the confidence of the validity of the resulting motion vector may be determined. Motion compensation of each current block may be performed from the previous MCTF output image in the search range 676 of previous output picture Out(-1) 672 by utilizing a motion vector. The amount of residual signal and noise after motion compensation may be measured at each pixel. The MCTF may include performing IIR temporal filtering of the input image or current input picture In(0) 674 in conjunction with the motion compensated previous output image or previous output picture Out(-1). The IIR filter may be controlled by the measurement of the MC residual after processing by a non-linear transfer function.

Figure 6A:
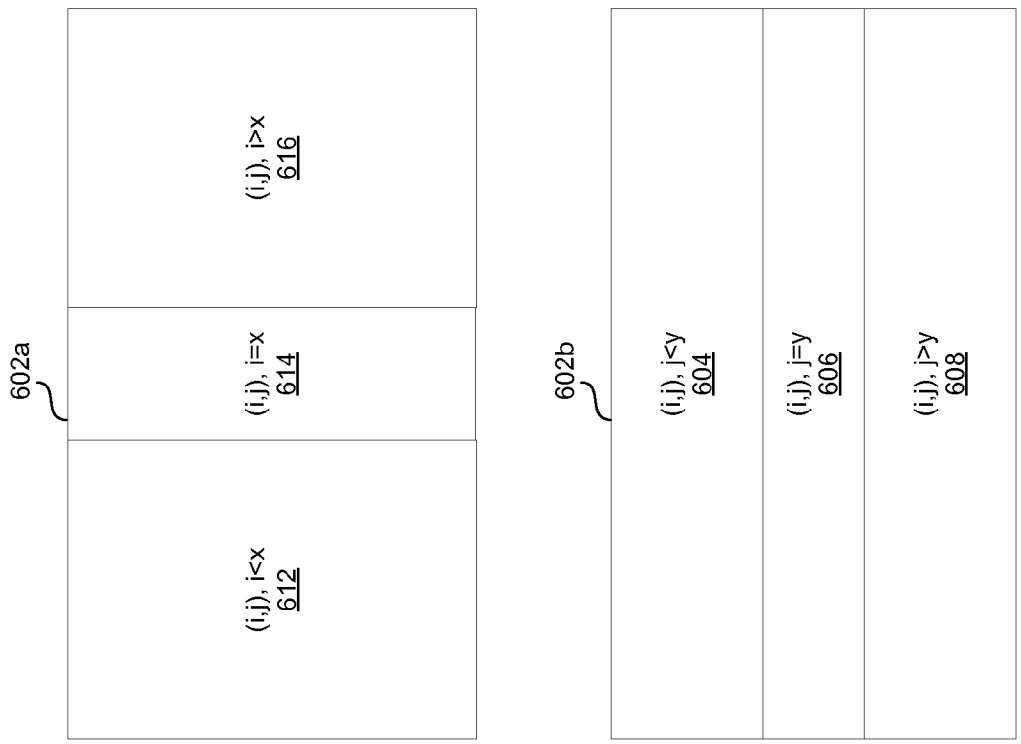
FIG. 6A is a block diagram illustrating a filter cost window of pixel data that is partitioned around a center pixel (x,y), according to an embodiment of the invention.

FIG. 6A is a block diagram illustrating a filter cost window of pixel data that is partitioned around a center pixel (x,y), according to an embodiment of the invention. Referring to FIG. 6A, there is shown a filter cost window 602 that may be partitioned horizontally as shown in window 602a comprising a section of i less than x pixels 612, a section of i equals x pixels 614 and a section of i greater than x pixels 616. In addition, the filter cost window 602 may be partitioned vertically as shown in window 602b comprising a section of j less than y pixels 604, a section of j equals y pixels 606 and a section of j greater than y pixels 608.

The window filter cost 602 may comprise dimensions w×h comprising a width of w pixels and a height of h pixels where each pixel may be represented by (i, j). The filter cost window 602 may have a center pixel (i=x, j=y) and may be partitioned into three sections horizontally comprising the section of i less than x pixels 612, the section of i equals x pixels 614 and the section of i greater than x pixels 616. The filter cost window 602 may be partitioned into three sections vertically comprising the section of j less than y pixels 604, the section of j equals y pixels 606 and the section of j greater than y pixels 608.

Figure 6B:
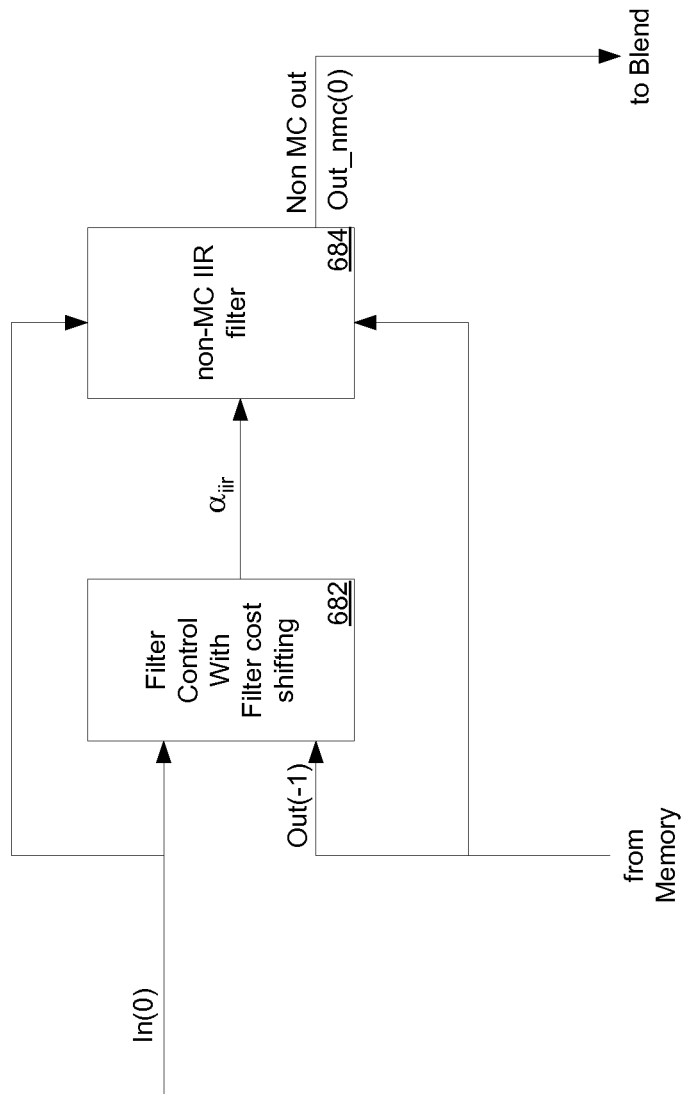
FIG. 6B is a block diagram of a non-MC path of an exemplary motion compensated temporal filtering system using infinite impulse response (IIR) filtering comprising a non-MC filter cost shift value, in accordance with an embodiment of the invention.

FIG. 6B is a block diagram of a non-MC path of an exemplary motion compensated temporal filtering system for noise reduction using infinite impulse response (IIR) filtering, in accordance with an embodiment of the invention. Referring to FIG. 6B, there is shown a filter control block 682, and a non-MC IIR filter block 684.

The filter control block 682 may comprise suitable logic, circuitry and/or code that may be enabled to calculate the differences between two pictures of video over a measurement window. This measurement window may be referred to as a filter cost window of the non-MC IIR filter block 684.

In accordance with an embodiment of the invention, the filter cost window size may be configurable, for example, to be 7×5 or 5×3. The non-MC IIR filter block 684 cost window size may also be independently configurable. The MC filter 522 (FIGS. 4A-4C) and non-MC IIR filter block 684 cost window sizes may be independently configurable.

The filter control block 682 may be enabled to compare the current input picture In(0) at each pixel with the previous output picture Out(−1) without motion compensation. The filter cost metric, when configured to use chroma SSD (sum of signed differences), may be represented, for example, based on the following expression:

$$\text{cost}_{non\_mc\_iir} = (2*\text{luma\_SAD} + abs(Cb\_SSD) + abs(Cr\_SSD) + 2)/4 \quad (20a)$$

Similarly, the filter cost metric, when configured to use chroma SAD (sum of absolute differences), may be represented, for example, based on the following expression:

$$\text{cost}_{non\_mc\_iir} = (2*\text{luma\_SAD} + abs(Cb\_SAD) + abs(Cr\_SAD) + 2)/4 \quad (20b)$$

The weighting factors in equations (20a) and (20b) may favor luma more than each chroma as luma may carry more information.

The output of the non-MC IIR filter block 684 may be specified, for example, as indicated by the following expression:

$$\text{Out\_nmc}(0) = (\alpha_{IIR} * \text{In}(0)) + (256 - \alpha_{IIR}) * (\text{Out}(-1)) + 128)/256 \quad (21)$$

where $\alpha_{IIR}$ is the output of the filter control block 682, and Out(−1) is the previous output picture. In another embodiment of the invention, the even indexed samples may be filtered although both In(0) and Out(−1) have been converted to the 4:4:4 format for the chroma sample filtering operations, which may lower the cost of the filter without any significant impact on visual quality.

The non-MC IIR filter block 684 may comprise suitable logic, circuitry and/or code that may be enabled to generate an output Out_nmc(0) to the blend block 528 (FIGS. 4A-4C). This output may be blended with the MC filter 522 output Out_mc(0) to generate the MCTF output. The filter cost value (cost$_{non\_mc\_iir}$) may be mapped to filter coefficients of the non-MC IIR filter block 684 by utilizing the non-linear transfer function as specified by the following expression:

$$\alpha_{IIR} = K_2(1 - (K_3/d^2)) \quad (22)$$

where d=4*filter_cost/(size of window), for example, and $K_2$ and $K_3$ are parameters that may be set according to the desired degree of filtering corresponding to the noise level of the input video and/or the expectations of a subsequent encoder.

The non-MC path blending factor including non-linearities may be calculated, for example, based on the following expressions:

$$m = \frac{4 * cost_{non\_mc\_iir}}{cost\_window\_size\_w * cost\_window\_size\_h} \quad (23a)$$

$$\alpha_{iir} = K_{non\_mc\_iir,0}\left(1 - \frac{K_{non\_mc\_iir,1}}{m^2}\right) \quad (23b)$$

$$\alpha_{iir} = clip3(\alpha_{iir}, \text{LOW\_THD}, 256) \quad (23c)$$

where LOW_THD may be a lower threshold value, $K_{non\_mc\_iir,0}$ and $K_{non\_mc\_iir,1}$ are parameters that may be set according to the desired degree of filtering corresponding to the noise level of the input video and/or the expectations of a subsequent encoder and the function clip3( ), the latter of which may be defined using the following exemplary pseudo code:

```
int clip3(int x, int y, int z)
{
    if(x<y) return y;
    else if(x>z) return z;
    else return x;
}
``` where x, y, and z may be suitable rational values.

Adjustments may be made for alpha for static pixels relative to the low threshold. This may be useful for noise reduction in a static noisy background of relatively noisy video. For example, in instances when the x component and y component of MV#0 are equal to zero, the adjustment may be determined utilizing the following exemplary pseudocode.

```
if (MV#0_x == 0 && MV#0_y == 0 )
{
    nmc_alpha_adj = nmc_alpha_low_adj;
    mc_alpha_adj = mc_alpha_low_adj;
}
else
{
    nmc_alpha_adj = 0;
    mc_alpha_adj = 0;
}
```

In this regard, nmc_alpha_low_adj and mc_alpha_low_adj may be programmable values, for example, in the range of [0, 127], inclusive. The values mnc_alpha_adj and mc_alpha_adj may be utilized to lower the blending factor lower bounds for both the MC and nonMC paths, as shown below.

The adjusted non-MC path blending factor may be determined based on the following expressions:

$$m = \frac{4 * cost_{non\_mc\_iir}}{cost\_window\_size\_w * cost\_window\_size\_h} \quad (23d)$$

$$\alpha\_iir = K_{non\_mc\_iir,0}\left(1 - \frac{K_{non\_mc\_iir,1}}{m^2}\right) \quad (23e)$$

$$\alpha\_iir = clip3(\alpha\_iir, \text{MAX(LOW\_THD\_nonMC} - \text{nmc\_alpha\_adj}, 0), 256) \quad (23f)$$

where LOW_THD_nonMC may be a programmable value in the range of [0, 256], and the function clip3( ) may be specified, for example, based on the following pseudocode:

```
int clip3(int x, int y, int z)
{
    if(x<y) return y;
    else if(x>z) return z;
```

-continued

```
        else return x;
}
```

In the equations (23a), (23b) and (23c), the cost and confidence values may be normalized by scaling. The division by the window size may be costly. Combining equations (20a) and (20b) with equation (23a), the normalized cost for the non-MC path may be approximated, for example, utilizing the following expressions:

$$m=(c_0*\text{luma\_SAD}+c_1*abs(Cb\_SSD)+c_1*abs(Cr\_SSD))>>14 \quad (23m)$$

or $$m=(c_0*\text{luma\_SAD}+c_1*abs(Cb\_SAD)+c_1*abs(Cr\_SAD))>>14 \quad (23n)$$

where $$c_0=((4*8192)/(\text{cost\_window\_size\_}w*\text{cost\_window\_size\_}h)) \quad (23o)$$

$$c_1=((4*4096)/(\text{cost\_window\_size\_}w*\text{cost\_window\_size\_}h)) \quad (23p)$$

In the above implementation, $c_0$ and $c_1$ may be programmable unsigned integer values, for example, since the window size is programmable and may be constrained, for example, based on the following expressions:

$$c_0+2*c_1=(\text{int})(65536/(\text{cost\_window\_size\_}w*\text{cost\_window\_size\_}h)) \quad (23q)$$

In various embodiments of the invention, an adjustment, for example, a shift, may be made to the filter cost calculation for the non-MC path. The adjustment may decrease unwanted artifacts, for example, motion trails. In this regard, the luma signed difference at a co-located position (i, j) may be defined as the luma difference, which may be specified using the following expression:

$$SDiff_n(i,j)=\text{In\_}Y(i,j,0)-\text{Out\_}Y(i,j,-1) \quad (23r)$$

A sum of signed differences for four regions of the w×h filter cost window 602 described with respect to FIG. 6A may be determine based on the following expressions:

$$Ssum\_right = \sum_{(i,j)\text{in w×h neighbor,with }i>x} SDiff_n(i,j) \quad (23s)$$

$$Ssum\_left = \sum_{(i,j)\text{in w×h neighbor,with }i<x} SDiff_n(i,j) \quad (23t)$$

$$Ssum\_lower = \sum_{(i,j)\text{in w×h neighbor,with }j>y} SDiff_n(i,j) \quad (23u)$$

$$Ssum\_upper = \sum_{(i,j)\text{in w×h neighbor,with }j<y} SDiff_n(i,j) \quad (23v)$$

When the filter cost window size has dimensions w×h=7×5, the value nmc_shift for luma may be defined utilizing the following expression:

$$nmc\_shift=\max(|Ssum\_right|,|Ssum\_left|,|Ssum\_lower|,|Ssum\_upper|)/16. \quad (23w)$$

When the filter cost window size has dimensions w×h that are smaller than 7×5 the value nmc_shift for luma may be defined utilizing the following expression:

$$nmc\_shift=\max(|Ssum\_right|,|Ssum\_left|,|Ssum\_lower|,|Ssum\_upper|)/8 \quad (23x)$$

where nmc_shift may be clipped within [0, 255] for an 8 bit system or [0, 1023] for a 10-bit system.

In various embodiments of the invention, nmc_shift for chroma components may be similarly defined utilizing corresponding chroma components.

The non-MC path cost may be adjusted utilizing nmc_shift. For example, in instances when the x component or the y component of the motion vector mv#0 does not equal zero, the non-MC cost may be approximated utilizing the following expressions.

$$m\approx[(c_0*\text{luma\_SAD}+c_1*abs(Cb\_SSD)+c_1*abs(Cr\_SSD))>>14]+nmc\_adj*nmc\_shift \quad (23y)$$

or $$m\approx[(c_0*\text{luma\_SAD}+c_1*abs(Cb\_SAD)+c_1*abs(Cr\_SAD))>>14]+nmc\_adj*nmc\_shift \quad (23z)$$

where nmc_adj may be a programmable weight in the range of [0, 31], inclusive. In (23y) or (23z), m may be clipped to [0, 1024] for 8 bit systems or to [0, 4096] for 10-bit systems. In this manner, noise may be reduced without causing motion artifacts such as motion trails.

Figure 6C:
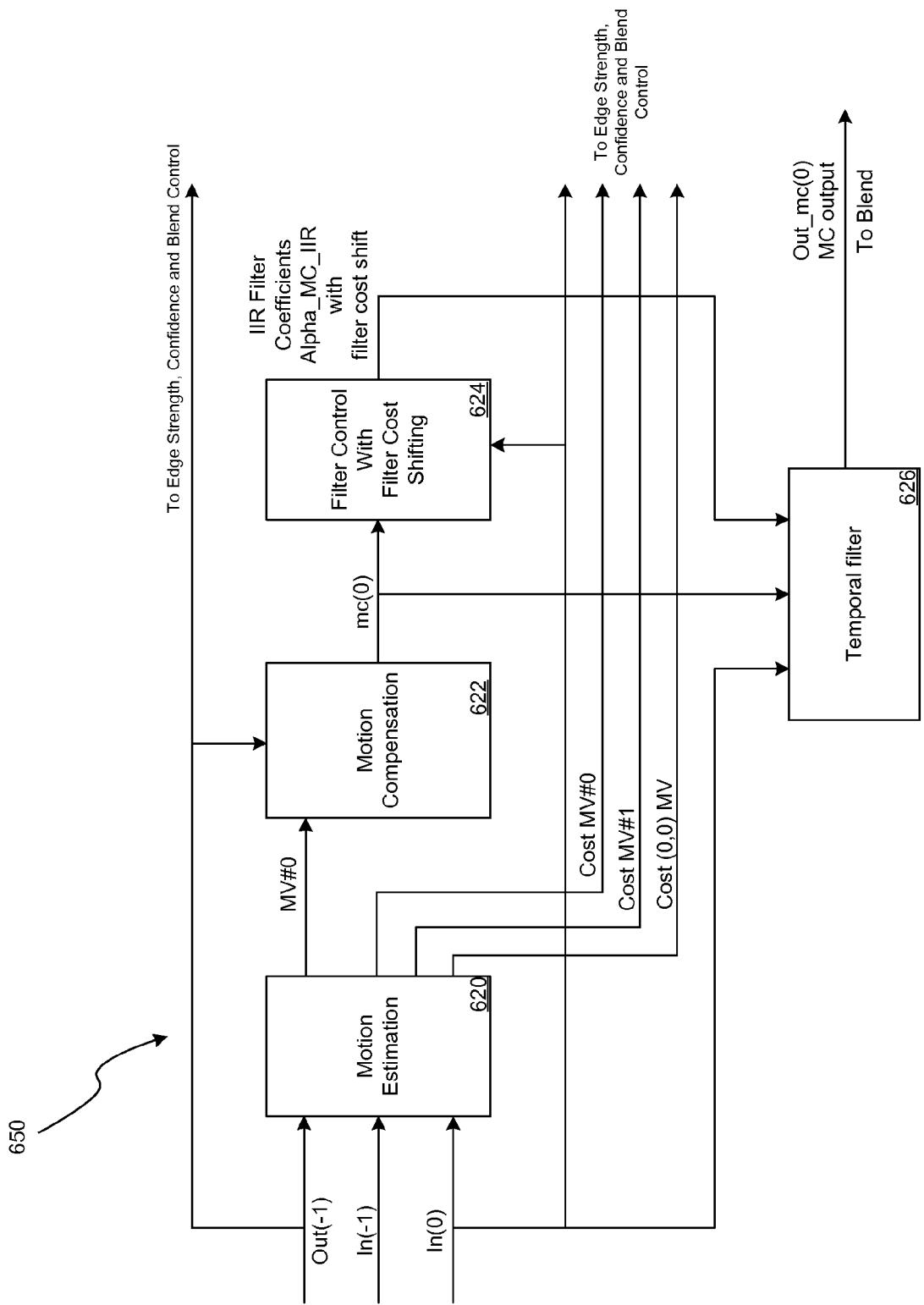
FIG. 6C is a block diagram of an MC path of an exemplary motion compensated temporal filtering system using infinite impulse response (IIR) filtering comprising a MC filter cost shift value, in accordance with an embodiment of the invention.

FIG. 6C is a block diagram of an MC path of an exemplary motion compensated temporal filtering system for noise reduction using infinite impulse response (IIR) filtering, in accordance with an embodiment of the invention. Referring to FIG. 6C, there is shown a MC filter module 650 that comprises a motion estimation block 620, a motion compensation block 622, a filter control block 624, and a temporal filter block 626.

The motion estimation (ME) block 620 may comprise suitable logic, circuitry and/or code that may be enabled to search a previous MCTF output picture Out(−1) after being converted to the 4:4:4 format in the search range 676 (FIG. 5) to find a motion vector (MV) with a suitable fit, for example, lowest cost, with respect to a current input picture In(0), or to search first a previous input picture In(−1) in the search range 676 to find a motion vector (MV) in integer precision with a suitable fit, for example, lowest cost, with respect to a current input picture In(0), and then search a previous MCTF output picture Out(−1) around the first MV to find a motion vector in sub-pixel precision with a suitable fit, for example, lowest cost, with respect to a current input picture In(0). Alternatively, the motion estimation function may be performed without converting the previous output or the current input to 4:4:4 format. Suitable interpolation may be applied to the chroma samples to enable the motion estimation function. The previous MCTF output picture Out(−1) and the current input picture In(0) may be converted to the 4:4:4 format by the video converter 532 (FIGS. 4A-4C). The set of pixels that are assigned one MV may be referred to as a pixel block. A pixel block may be as small as 1×1, or one pixel, or it may be larger. For example, the pixel block size may be 3×1 i.e. 3 pixels wide and 1 pixel tall. A pixel block size larger than 1×1 may be chosen to reduce implementation complexity for motion estimation and motion compensation. The implementation cost of the ME function may be related to the inverse of the pixel block size. The motion estimation (ME) block 620 may be enabled to receive the previous output picture Out(−1), the previous input picture In(−1), and the current input picture In(0) and generate a plurality of motion vectors, MV#0 and MV#1, for example.

Each candidate motion vector may be evaluated using a cost metric measured over a window 678 of pixels. The size of the window 678 (FIG. 5) may be independent of the size of the pixel block. For example, the ME window size may be 7×5, i.e. 7 pixels wide and 5 pixels high. The ME block 620 may utilize a cost metric that may be a sum of absolute differences (SAD) for luma samples and sum of signed differences (SSD) for chroma samples. These cost metrics may be combined into one cost as indicated utilizing the following exemplary expression:

$$\text{cost} = (2*(\text{luma\_SAD}) + abs(Cb\_\text{SSD}) + abs(Cr\_\text{SSD}) + 2)/4 \quad (24a)$$

where Cb_SSD and Cr_SSD are the SSD values of Cb and Cr components respectively. Notwithstanding, the cost metric may also be denoted as follows:

$$\text{cost} = (2*\text{luma\_SAD} + Cb\_\text{SAD} + Cr\_\text{SAD} + 2)/4,$$

where Cb_SAD and Cr_SAD are the SAD values of Cb and Cr components respectively. Alternative cost metrics and combinations of cost metrics may be used. For example SAD may be used for both luma and chroma.

The weighting factors in equation (24a) may favor luma more than each chroma as luma may carry more information. The motion estimation block 620 may be enabled to search a reference picture, for example, Out(−1) within a search range 676. The first stage of this search may include integer MV positions. The lowest and second lowest cost MV's may be determined, and they may be labeled as MV#0 and MV#1, respectively.

The cost metric for neighboring half-pixel position MV's with a +/−½ pixel MV offset in with respect to the vector MV#0 may be determined. In accordance with an embodiment of the invention, the cost metric for eight neighboring half-pixel position MV's with a +/−½ pixel MV offset in both horizontal and vertical axes of the MV#0 may be determined. Alternatively, vectors along only the horizontal axis may be evaluated. The lowest cost MV and the second lowest cost MV may be updated during the half-pel search. The updated lowest cost MV and second lowest cost MV may be labeled as MV#0 and MV#1 respectively. The MV#1 may be utilized in a subsequent step for determining a confidence metric of the choice of MV#0. The half-pixel positions may be created using two-tap interpolation filters, for example.

The motion compensation (MC) block 622 may comprise suitable logic, circuitry and/or code that may be enabled to generate motion-compensated pixels from a reference image or previous output picture Out(−1), in the 4:4:4 format, by utilizing the lowest cost half-pel MV or MV#0 generated by the MC block 622.

The filter control block 624 may comprise suitable logic, circuitry and/or code that may be enabled to compare the current input image or picture In(0) at each pixel with the motion compensated result from the ME function using MV#0 on the previous output picture Out(−1), for example. These comparisons may be performed in the 4:4:4 format or alternatively in another format, for example the 4:2:2 format. The comparison may be performed using another measurement window that is similar in principle to the ME window 678. However, the filter control window may have a different size such as 5×3 or 7×5, for example. A cost metric may be generated over the measurement window, using a cost metric that may be similar to the ME cost metric. The filter cost metric may be represented utilizing the following expression:

$$\text{cost}_{mc\_iir} = (2*\text{luma\_SAD} + abs(Cb\_\text{SSD}) + abs(Cr\_\text{SSD}) + 2)/4 \quad (24b)$$

The filter cost may be calculated for each pixel in the input picture In(0), and the ME cost may be calculated using windows of the input picture that may step by 3 pixels every MV, for example. The window for the filter cost, $\text{cost}_{mc\_iir}$, may be centered at the pixel that is being filtered. The weighting factors in equation (24b) may favor luma more than each chroma as luma may carry more information.

In accordance with an embodiment of the invention, the filter cost window size may be configurable, for example, to be 7×5 or 5×3. The non-MC path filter cost window may also be configurable. The MC path and non-MC path filter cost window sizes may be independently configurable.

The filter cost value (filter_cost) may be mapped to filter coefficients of the IIR temporal filter in the MC path by utilizing the non-linear transfer function specified by the following expression:

$$\alpha_{mc\_iir} = K_0(1 - (K_1/d^2)) \quad (25)$$

where d=16*cost_mc_iir/(size of window). The value 16 may be changed and other values may be utilized accordingly, to facilitate fixed point operations. $K_0$ and $K_1$ are parameters that may be set according to the desired degree of filtering corresponding to the noise level of the input video and/or the expectations of a subsequent encoder.

The MC path blending factor including non-linearities may be calculated utilizing the following expressions:

$$m = \frac{16 * \text{cost}_{mc\_iir}}{\text{cost\_window\_size\_w} * \text{cost\_window\_size\_h}} \quad (26a)$$

$$\alpha_{mc\_iir} = K_{mc\_iir,0}\left(1 - \frac{K_{mc\_iir,1}}{m^2}\right). \quad (26b)$$

$$\alpha_{mc\_iir} = \text{clip3}(\alpha_{mc\_iir}, \text{LOW\_THD}, 256). \quad (26c)$$

where $K_{mc\_iir,0}$ and $K_{mc\_iir,1}$ are parameters that may be set according to the desired degree of filtering corresponding to the noise level of the input video and/or the expectations of a subsequent encoder and the function clip3( ) may be defined utilizing the following exemplary pseudocode:

```
int clip3(int x, int y, int z)
{
    if(x<y) return y;
    else if(x>z) return z;
        else return x;
}
```

Adjustments may be made for alpha for static pixels relative to the low threshold. This may be useful for noise reduction in a static noisy background of relatively noisy video. For example, in instances when the x component and y component of MV#0 are equal to zero, the following adjustment may be determined utilizing the following pseudocode:

```
if (MV#0_x == 0 && MV#0_y == 0 )
{
    nmc_alpha_adj = nmc_alpha_low_adj;
    mc_alpha_adj = mc_alpha_low_adj;
}
else
{
```

-continued
```
        nmc_alpha_adj = 0;
        mc_alpha_adj = 0;
    }
```

In this regard, mc_alpha_low_adj may be a programmable value, for example, in the range of [0, 127], inclusive. The values mnc_alpha_adj and mc_alpha_adj may be utilized to lower the blending factor lower bounds for both the MC and non-MC paths as shown below:

The adjusted MC path blending factor may be determined utilizing the following expressions:

$$m = \frac{16 * cost_{mc\_iir}}{cost\_window\_size\_w * cost\_window\_size\_h}. \quad (26d)$$

$$\alpha_{mc\_iir} = K_{mc\_iir,0}\left(1 - \frac{K_{mc\_iir,1}}{m^2}\right) \quad (26e)$$

$$\alpha_{mc\_iir} = clip3(\alpha_{mc\_iir}, MAX(LOW\_THD\_MC - mc\_alpha\_adj, 0), 256) \quad (26f)$$

where LOW_THD_MC may be a programmable value in the range of [0, 256]. A factor for blending the non-MC and MC paths may be determined utilizing the following expressions:

$$m = \frac{4 * confidence}{me\_window\_size\_w * me\_window\_size\_h}. \quad (26g)$$

$$blend_{mc\_nonmc} = K_{mc\_nonmc,0}\left(1 - \frac{K_{mc\_nonmc,1}}{m^2}\right) \quad (26h)$$

$$blend_{mc\_nonmc} = clip3(blend_{mc\_nonmc}, 0, 256) \quad (26i)$$

Combining equation (24b) with equation (26a), the normalized cost for the MC path may be approximated utilizing the following expression:

$$m >> (b_0 * luma\_SAD + b_1 * abs(Cb\_SSD) + b_1 * abs(Cr\_SSD)) >> 14 \quad (26j)$$

where $$b_0 = ((16*8192)/(cost\_window\_size\_w*cost\_window\_size\_h) \quad (26k)$$

$$b_1 = ((16*4096)/(cost\_window\_size\_w*cost\_window\_size\_h) \quad (26l)$$

In the above implementation, $b_0$ and $b_1$ may be programmable unsigned integer values, for example, since the window size may be programmable and may be constrained as indicated by the following expression:

$$b_0 + 2*b_1 = (int)(262144/(cost\_window\_size\_w*cost\_window\_size\_h)) \quad (26m)$$

In various embodiments of the invention, an adjustment, for example, a shift, may be made to the filter cost calculation for the motion compensation (MC) path. The adjustment may decrease unwanted artifacts, for example, motion trails. In this regard, the luma signed difference at a co-located position (i, j) may be defined as the luma difference between the current picture and the MC recursive feedback picture, utilizing the following expression:

$$SDiff_n(i,j) = In\_Y(i,j,0) - Out\_Y(i+mvx, j+mvy, -1) \quad (26n)$$

In instances when motion estimation (ME) may be done only in the horizontal direction, the y component of the motion vector mvy may be equal to zero.

A sum of signed differences for four regions of the w×h filter cost window 602 described with respect to FIG. 6A may be determined as specified by the following expression:

$$Ssum\_right = \sum_{(i,j) \text{ in } w \times h \text{ neighbor, with } i > x} SDiff_n(i,j) \quad (26o)$$

-continued $$Ssum\_left = \sum_{(i,j) \text{ in } w \times h \text{ neighbor, with } i < x} SDiff_n(i,j) \quad (26p)$$

$$Ssum\_lower = \sum_{(i,j) \text{ in } w \times h \text{ neighbor, with } j > y} SDiff_n(i,j) \quad (26q)$$

$$Ssum\_upper = \sum_{(i,j) \text{ in } w \times h \text{ neighbor, with } j < y} SDiff_n(i,j) \quad (26r)$$

When the filter cost window size has dimensions w×h=7×5, the value mc_shift for luma may be defined utilizing the following expression.

$$mc\_shift = max(|Ssum\_right|, |Ssum\_left|, |Ssum\_lower|, |Ssum\_upper|)/16 \quad (26s)$$

When the filter cost window size has dimensions w×h that are smaller than 7×5 the value mc_shift for luma may be defined as specified by the following expression:

$$mc\_shift = max(|Ssum\_right|, |Ssum\_left|, |Ssum\_lower|, |Ssum\_upper|)/8 \quad (26t)$$

where nmc_shift may be clipped within [0, 255] for an 8 bit system or [0, 1023] for a 10-bit system.

In various embodiments of the invention, mc_shift for chroma components may be similarly defined utilizing corresponding chroma components.

A value determined based on mc_shift may be utilized to adjust the MC path filter cost as follows. For example, in instances when the x component or the y component of the motion vector mv#0 does not equal zero, the MC filter cost may be approximated as specified utilizing the following expression:

$$m \approx [(b_0 * luma\_SAD + b_1 * abs(Cb\_SSD) + b_1 * abs(Cr\_SSD)) >> 14] + mc\_adj * mc\_shift \quad (26u)$$

where mc_adj may be a programmable weight in the range of [0, 31], inclusive. In (23o) or (230), the approximation m may be clipped to [0, 1024] for 8 bit systems or to [0, 4096] for 10-bit systems.

The temporal filter 626 may comprise suitable logic, circuitry and/or code that may be enabled to generate a motion compensated output out_mc(0) to the blend block 528. The temporal filter in the MC path may be an IIR filter, for example. The feedback term or the output picture Out(−1) may be the previously generated output from the entire MCTF. The MC temporal filter 626 output may be specified utilizing the following expression:

$$\text{Out\_}mc(0)=((\alpha_{MC\_IIR}*\text{In}(0))+(256-\alpha_{MC\_IIR})*(mc(0))+128)/256 \qquad (27)$$

where $\alpha_{MC\_IIR}$ is the output of the filter control block 624, and mc(0) is the output of the motion compensation block 622. It is derived from the feedback term out(−1) through motion compensation.

In another embodiment of the invention, the even indexed samples may be filtered although both In(0) and Out(−1) have been converted to the 4:4:4 format for the chroma sample filtering operations. This may lower the cost without any significant impact on visual quality. The temporal filter 626 may be enabled to generate the resulting output in the 4:2:2 format, for example.

In another embodiment of the invention, the horizontal and vertical edge gradients may be calculated and utilized to adjust the blending control to combine the MC path output Out_mc(0) and non-MC path output Out_nmc(0). The vertical gradient may be utilized to decrease the confidence level, and the horizontal gradient may offset the effect introduced by the vertical gradient, in order to reduce the flickering effect of near horizontal edges in the combined result. The edge strength calculations may be performed on the difference of the luma components of the current unfiltered picture In(0) and the previous output reference or filtered picture Out(−1).

The vertical gradient or the horizontal edge strength may be calculated by applying a plurality of filter templates to a neighborhood of the luma component that may correspond to the difference between the current input picture In(0) and the previous output picture Out(−1). The filter templates may be centered at the center pixel of a 3×1 pixel block, for example. The gradient may be calculated once for each 3×1 pixel block, for example. The plurality of filter templates may be represented, for example, as follows:

$$\begin{pmatrix} 1 & 1 & 1 & 2 & 1 & 1 & 1 \\ -1 & -1 & -1 & -2 & -1 & -1 & -1 \\ 0 & 0 & 0 & 0 & 0 & 0 & 0 \end{pmatrix} \qquad (28)$$

and $$\begin{pmatrix} 0 & 0 & 0 & 0 & 0 & 0 & 0 \\ 1 & 1 & 1 & 2 & 1 & 1 & 1 \\ -1 & -1 & -1 & -2 & -1 & -1 & -1 \end{pmatrix}$$

The horizontal edge strength may be calculated, for example, as indicated utilizing the following expression:

$$h\_edge\_diff = \max(abs(temp1), abs(temp2))/2 \qquad (29)$$

where temp1 and temp2 are the output values generated by applying the plurality of filter templates to a neighborhood of the luma component of the difference between the current input picture In(0) and the previous output picture Out(−1).

The horizontal gradient or the vertical edge strength may be calculated by applying the following two templates to the neighborhood of the luma difference between the current input picture In(0) and the previous output picture Out(−1), centered at the center pixel of the 3×1 pixel block, for example. The plurality of filter templates may be represented, for example, as follows:

$$\begin{pmatrix} 1 & 1 & -1 & -1 & 0 \\ 2 & 2 & -2 & -2 & 0 \\ 1 & 1 & -1 & -1 & 0 \end{pmatrix} \text{ and } \begin{pmatrix} 0 & 1 & 1 & -1 & -1 \\ 0 & 2 & 2 & -2 & -2 \\ 0 & 1 & 1 & -1 & -1 \end{pmatrix} \qquad (30)$$

The vertical edge strength may be calculated for example, as indicated utilizing the following expression:

$$v\_edge\_diff = \max(abs(temp3), abs(temp4))/2 \qquad (31)$$

where temp3 and temp4 are the output values generated by applying the plurality of filter templates to a neighborhood of the luma component of the difference between the current input picture In(0) and the previous output picture Out(−1). The final value of the edge strength that may be utilized to adjust the confidence level may be calculated, for example, utilizing the following expression:

$$edge\_strength\_adj = \max(0, h\_edge\_diff - v\_edge\_diff) \qquad (32)$$

In order to improve noise reduction effectiveness it may be necessary to achieve both significant noise reduction in areas of little or no motion and be free of motion artifacts such as motion trails, motion blur, jittering or wobbling in areas where there is motion. In this manner, noise may be reduced without causing motion artifacts such as motion trails.

Figure 6D:
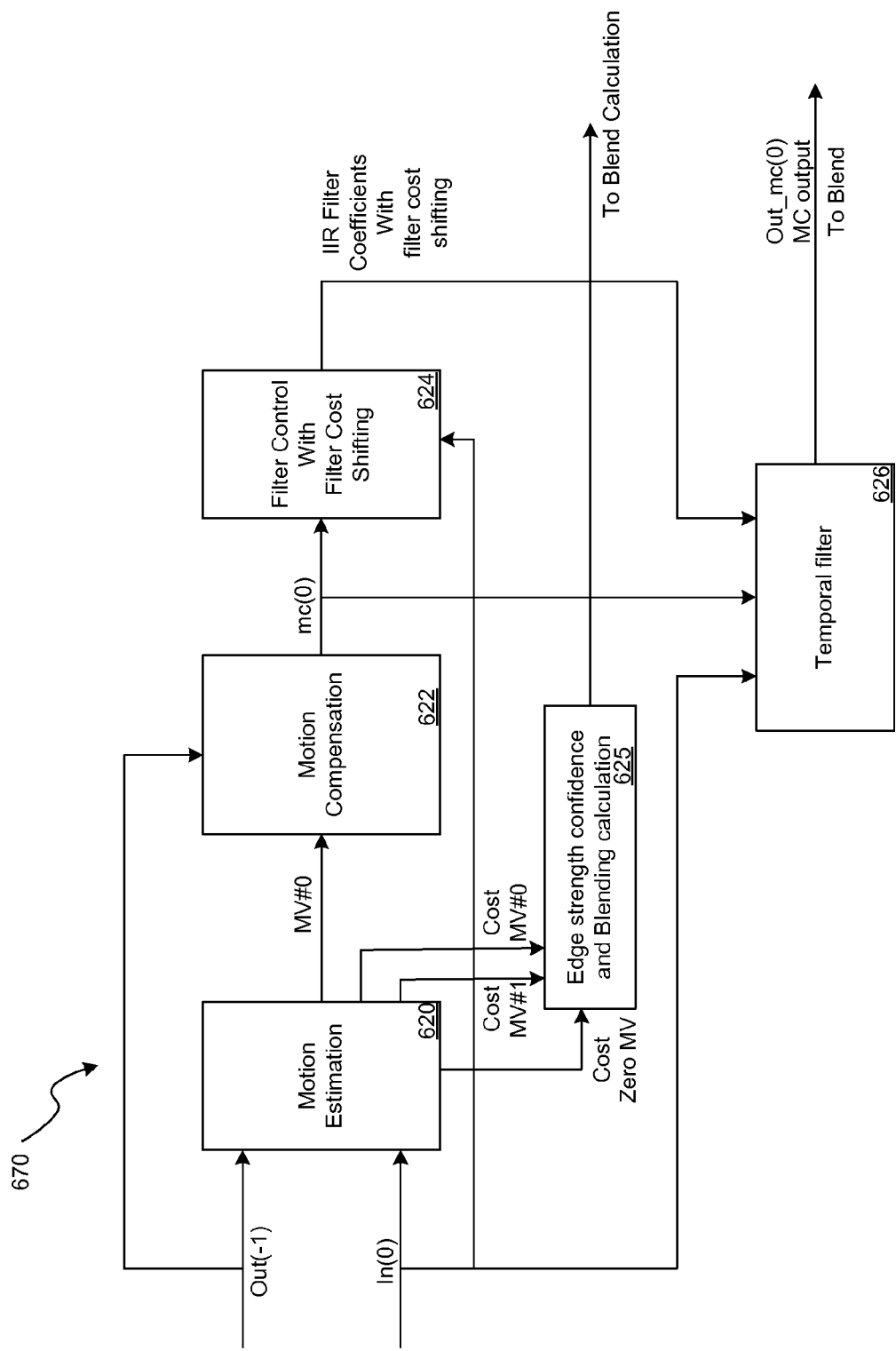
FIG. 6D is a block diagram of an MC path of another exemplary motion compensated temporal filtering system using infinite impulse response (IIR) filtering, in accordance with an embodiment of the invention.

FIG. 6D is a block diagram of an MC path of another exemplary motion compensated temporal filtering system for noise reduction using infinite impulse response (IIR) filtering, in accordance with an embodiment of the invention. Referring to FIG. 6D, there is shown a MC filter module 670 that comprises a motion estimation block 620, a motion compensation block 622, a filter control block 624, an edge strength confidence and blending control block 625, and a temporal filter block 626.

The motion estimation (ME) block 620 may comprise suitable logic, circuitry and/or code that may be enabled to search a previous MCTF output picture Out(−1) in the search range 676 (FIG. 5) to find a motion vector (MV) in integer precision with a suitable fit, for example, lowest cost, with respect to a current input picture In(0) and then search a previous MCTF output picture Out(−1) around the first MV to find a motion vector in sub-pixel precision with a suitable fit, for example, lowest cost, with respect to a current input picture In(0). The previous MCTF output picture Out(−1) and the current input picture In(0) may be converted to the 4:4:4 format by the video converter 532 (FIGS. 4A-4C). The set of pixels that are assigned one MV may be referred to as a pixel block. A pixel block may be as small as 1×1, or one pixel, or it may be larger. For example, the pixel block size may be 3×1 i.e. 3 pixels wide and 1 pixel tall. A pixel block size larger than 1×1 may be chosen to reduce implementation complexity for motion estimation and motion compensation. The implementation cost of the ME function may be related to the inverse of the pixel block size. The motion estimation (ME) block 620 may be enabled to receive the previous output picture Out(−1), and the current input picture In(0) and generate a plurality of motion vectors, MV#0 and MV#1, for example.

Each candidate motion vector may be evaluated using a cost metric measured over a window 678 of pixels. The size of the window 678 (FIG. 5) may be independent of the size of the pixel block. For example, the ME window size may be 7×5, i.e. 7 pixels wide and 5 pixels high. The ME block 620 may utilize a cost metric that may be a sum of absolute differences (SAD) for luma samples and sum of signed differences (SSD)

for chroma samples. These cost metrics may be combined into one cost as specified by the following exemplary expression:

$$cost=(2*luma\_SAD+abs(Cb\_SSD)+abs(Cr\_SSD)+2)/4 \quad (24a)$$

where Cb_SSD and Cr_SSD are the SSD values of Cb and Cr components respectively. Alternatively, the cost metric may be defined as follows: cost=(2*luma_SAD+Cb_SAD+Cr_SAD+2)/4, where Cb_SAD and Cr_SAD are the SAD values of Cb and Cr components respectively.

The weighting factors in equation (24a) may favor luma more than each chroma as luma may carry more information. The motion estimation block 620 may be enabled to search a reference picture, for example, Out(−1) within a search range 676. The first stage of this search may include integer MV positions. The lowest and second lowest cost MV's may be determined, and they may be labeled as MV#0 and MV#1, respectively.

The edge strength confidence and blending calculation block 625 may comprise suitable logic, circuitry and/or code that may be enabled to receive the cost metrics for the MV#0, MV#1 and the (0,0) motion vector, and the luma components of the current input picture In(0) and the previous output picture Out(−1). The edge strength adjustment value may be calculated substantially as in equations (28), (29), (30), (31) and (32). A confidence value may be calculated substantially as in equations (11a) and (11b).

The motion compensation (MC) block 622 may comprise suitable logic, circuitry and/or code that may be enabled to generate motion-compensated pixels from a reference image or previous output picture Out(−1), by utilizing the lowest cost half-pel MV or MV#0 generated by the MC block 622.

The filter control block 624 may be substantially as described in FIG. 6C. The temporal filter 626 may comprise suitable logic, circuitry and/or code that may be enabled to generate a motion compensated output out_mc(0) to the blend block 528 (FIGS. 4A-4C). The temporal filter in the MC path may be an IIR filter, for example. The feedback term or the output picture Out(−1) may be the previously generated output from the entire MCTF. The MC temporal filter 626 output may be specified utilizing the following exemplary expression:

$$Out\_mc(0)=((\alpha_{MC\_IIR}*In(0))+(256-\alpha_{MC\_IIR})*(mc(0))+128)/256 \quad (27)$$

where $\alpha_{MC\_IIR}$ is the output of the filter control block 624, and mc(0) is the output of the motion compensation block 622. It is derived from the feedback term out(−1) through motion compensation. In this manner, noise may be reduced without causing motion artifacts such as motion trails.

Figure 7:
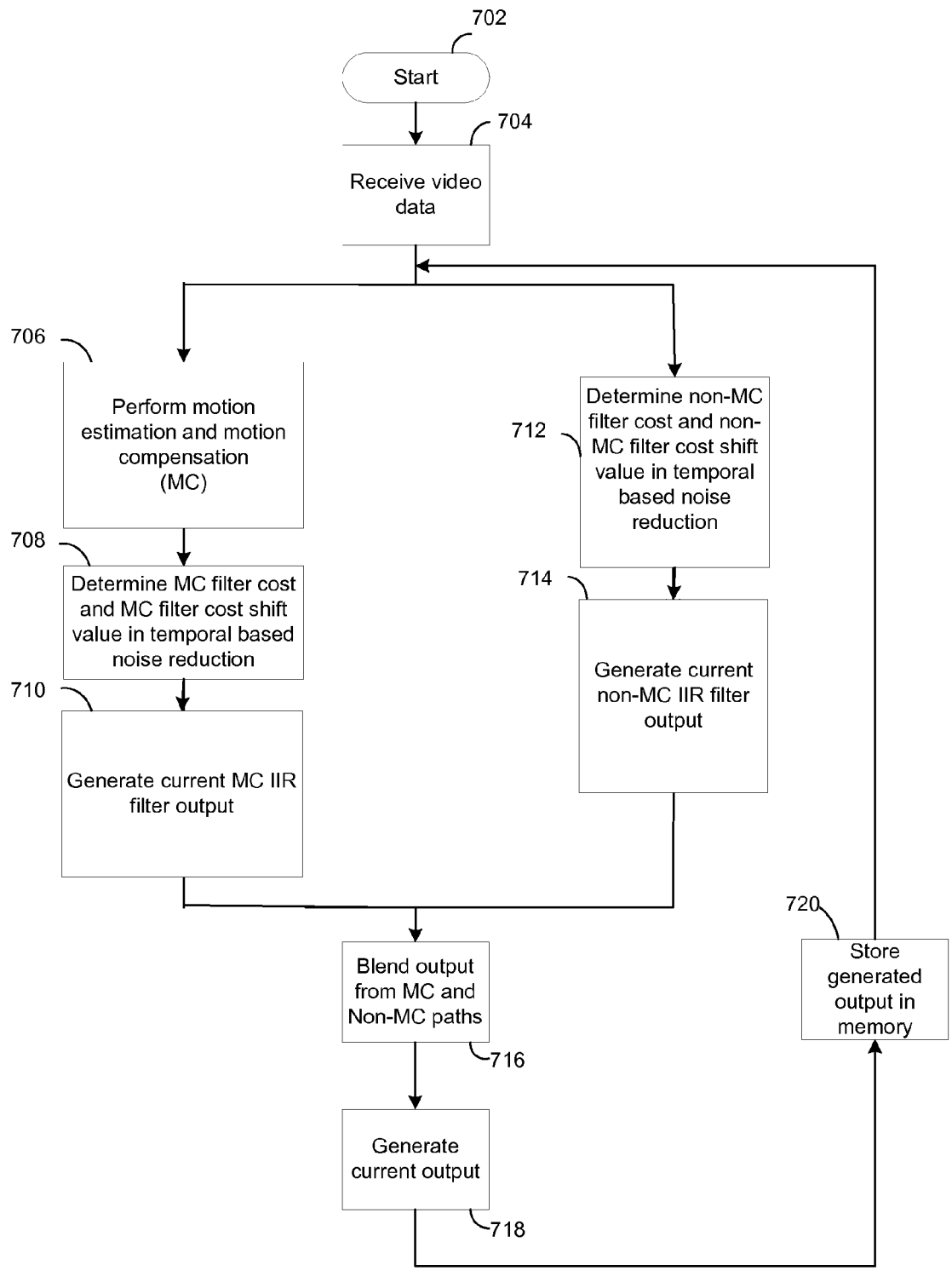
FIG. 7 is a flowchart illustrating exemplary steps for motion compensated temporal filtering system using infinite impulse response (IIR) filtering comprising filter cost shift values, in accordance with an embodiment of the invention.

FIG. 7 is a flowchart illustrating exemplary steps for a motion compensated temporal filtering system using infinite impulse response (IIR) filtering, in accordance with an embodiment of the invention. Referring to FIG. 7, exemplary steps may begin at step 702. In step 704, the MCTF system may be enabled to receive and convert the video data. In step 706, the MC filter block 522 (FIGS. 4A-4C) in the MC path may be operable to determine motion vectors and motion compensated (MC) video data. In step 708, the MC filter block 522 may be operable to determine a MC filter cost and a MC filter cost shift value that may enable reduction of motion trails of low contrast contours. In step 710, the MC filter block 522 may be operable to filter the MC video data based on the MC shifted filter cost value and generate a MC output picture of video data (Out_mc(0)). In step 712, the non-MC filter block 524 (FIGS. 4A-4C) in the non-MC path may be operable to determine a non-MC filter cost and a non-MC cost shift value that may enable reduction of motion trails of low contrast contours in temporal filtering based noise reduction. In step 714, the non-MC filter block 524 may be operable to filter the non-MC video data based on the non-MC shifted filter cost value and generate a non-MC output picture of video data (Out_nmc(0)). In step 716, the blend block 528 (FIGS. 4A-4C) may be operable to blend the generated MC output picture of video data (Out_mc(0)) and the generated non-MC output picture of video data (Out_nmc(0)). In step 718, at least one output picture of video data (Out(0)) may be generated by utilizing the blended MC output picture of video data (Out_mc(0)) and the generated non-MC output picture of video data (Out_nmc(0)). In step 720, the blended output Out(0) may be stored in the memory 526 (FIGS. 4A-4C) and/or sent back to the input at steps 706 and 712 to be utilized in processing of the next received video data. The blended output Out(0) may also be sent to, for example, a digital video encoder.

In accordance with an embodiment of the invention, a method and system for motion compensated temporal filtering using infinite impulse response (IIR) filtering may comprise at least one circuit, for example, a non-MC filter block 524 that enables generation of a corresponding non-motion compensated output picture of video data (Out_nmc(0)) from at least one infinite impulse response (IIR) filtered output picture of video data (IIR_out(0)). The MC filter module may be enabled to generate a motion compensated output picture of video data (Out_mc(0)) by blending at least one motion compensated picture of video data mc(0) and at least one current input picture of video data (in(0)). In this regard, mc(0) may be motion compensated from out(−1).

The blend block 528 may enable blending of the motion compensated output picture of video data (Out_mc(0)) and the generated corresponding non-motion compensated output picture of video data (Out_nmc(0)). At least one output picture of video data (Out(0)) may be generated by utilizing the generated motion compensated output picture of video data (Out_mc(0)) and the generated corresponding non-motion compensated output picture of video data (Out_nmc(0)).

The MC filter block 522 may enable utilization of the previously generated portion of the output picture of video data (Out(−1)) to determine at least one motion vector (MV) based on a cost metric to represent a motion of the video data of at least one input picture of the video data (In(0)). The motion compensated output picture of video data (Out_mc(0)) may be generated by utilizing at least one determined motion vector to represent the motion of video data. The MC filter block may also determine a confidence metric of the determined motion vector.

The blend calculation block 530 (FIGS. 4A-4C) may be enabled to estimate the confidence metric of MV#0 by utilizing a combination of three metrics, for example, a first metric (cost_MV#1−cost_MV#0), which indicates how much lower MV#0 is than the next lowest cost MV, a second metric (cost_zero_MV−cost_MV#0), which indicates how much better MV#0 is compared to the zero (0,0) vector, and a third metric may be the horizontal edge strength, edge_strength_adj. These metrics may be combined, for example, utilizing the following expression:

$$confidence\_mv=\max((cost\_zero\_MV-cost\_MV\#0),(cost\_MV\#1-cost\_MV\#0)) \quad (11a)$$

$$confidence=\max(0,confidence\_mv-edge\_strength\_adj) \quad (11b)$$

The motion compensated output picture of video data (Out_mc(0)) may be generated by temporal filtering of video data with the determined motion vector (MV). The temporal filter in the MC path may be an IIR filter, for example. The feedback term or the output picture Out(−1) may be the previously generated output from the entire MCTF. The MC temporal filter 626 output may be specified, for example, utilizing the following expression:

$$\text{Out}\_mc(0)=((\alpha_{MC\_IIR}*\text{In}(0))+(256-\alpha_{MC\_IIR})*(mc(0))+128)/256 \tag{27}$$

The cost metric may comprise a combination of a sum of absolute differences (SAD) for luma components of video data and a sum of signed differences (SSD) for chroma components of video data. A cost metric may be generated over the measurement window, using a cost metric that may be similar to the ME cost metric. The filter cost metric may be represented, for example, utilizing the following expression:

$$\text{cost}_{mc\_iir}=(2*\text{luma\_SAD}+abs(Cb\_\text{SSD})+abs(Cr\_\text{SSD})+2)/4 \tag{24b}$$

The filter cost may be calculated for each pixel in the input picture In(0), and the ME cost may be calculated using windows of the input picture that may step by 3 pixels every MV, for example.

The motion vector (MV) may be determined based on a lowest cost of a plurality of candidate MVs that may be applied to at least one input picture of video data (In(0)). The motion estimation (ME) block 620 (FIGS. 6C-6D) may be enabled to search a previous MCTF output picture out(−1) after being converted to the 4:4:4 format in the search range 676 (FIG. 5) to find a motion vector (MV) with a suitable fit, for example, lowest cost, with respect to a current input picture In(0) after being converted to the 4:4:4 format. Alternatively, the ME block 620 may be enabled to search a previous MCTF output picture out(−1) with respect to a current input picture In(0) without converting to the 4:4:4 format. Suitable interpolation may be applied to the chroma samples to enable the motion estimation function.

The previously generated portion of the output picture of video data (Out(−1)) may be fed back to the MC filter block 522 to determine the motion compensated output picture of video data (Out_mc(0)). The previously generated portion of the output picture of video data (Out(−1)) may be fed back to the non-MC filter block 524 to determine the generated corresponding non-motion compensated output picture of video data (Out_nmc(0)).

A blending factor, $\alpha_{blend}$ may be determined for blending the motion compensated output picture of video data (Out_mc(0)) and the generated corresponding non-motion compensated output picture of video data (Out_nmc(0)). A horizontal edge gradient and/or a vertical edge gradient may be calculated to adjust the determined blending factor $\alpha_{blend}$. The vertical gradient may be utilized to decrease the confidence level, and the horizontal gradient may offset the effect introduced by the vertical gradient, in order to reduce the flickering effect of near horizontal edges in the combined result. At least one IIR filtered output picture of video data (IIR_out(0) may be generated based on an IIR blending factor $\alpha_{iir}$. The IIR blending factor $\alpha_{iir}$ may be dynamically modified based on a motion metric parameter.

In an embodiment of the invention, one or more current output pictures of video data Out(0) from the blend block 528, for example, may be generated utilizing a generated motion compensated blended picture of video data, MCout, from the motion compensated filter 522 and a corresponding generated non-motion compensated blended picture of the video data, non-MCout, from the non-motion compensated filter 524, for example. In this regard, a motion compensated blended picture of video data, MCout, may be generated utilizing one or more motion compensated partitioned windows of picture data, for example, an exemplary partitioned window of picture data is illustrated in FIG. 6A. Also, a corresponding non-motion compensated blended picture of video data, non-MCout, may be generated utilizing one or more non-motion compensated partitioned windows of the picture data.

With regard to output from the MC filter 522, MCout, one or more of windows of picture data from a first picture of video data, for example, In(0) and one or more motion compensated windows of picture data from a motion compensated previously generated output picture of video data, for example, Out(−1) may be partitioned. The partitioned widows of picture data from the first picture of video data In(0) may be compared with corresponding ones of the partitioned motion compensated windows of picture data from the motion compensated previously generated output picture of video data Out(−1) in the MC filter 522. The first picture of video data In(0) may be blended with the motion compensated previously generated output picture of the video data Out(−1) based on the comparison. Out(−1) is a final output from the blend block 528 that may receive data from the output of the MC filter 522. In this regard, Out(−1) may be referred to as the motion compensated (MC) previously generated output picture of video data. Furthermore, a blending factor that may be utilized by the MC filter 522, may be shifted based on the comparison. The shifted blending factor may enable, for example, a reduction in motion trail artifacts in the non-motion compensated blended first picture of video data with the motion compensated previously generated output picture of video data.

With regard to the output of the non-MC filter 524, non-MCout, one or more non-motion compensated windows of picture data from a motion compensated previously generated output picture of video data, Out(−1) may be partitioned, as shown, for example, in FIGS. 4A and 4C. Alternatively, a non-motion compensated previously generated output picture of video data out_nmc(−1), for example, that may be output from the non-MC filter 524 may be partitioned, as shown, for example in FIG. 4B. The partitioned windows of picture data from the first picture of video data In(0) may be compared with corresponding ones of the partitioned non-motion compensated windows of picture data from the motion compensated previously generated output picture of video data out(−1) in the non-MC filter 524 as described with respect to, for example FIG. 4A and FIG. 4C, or compared with corresponding ones of the non-motion compensated previously generated output picture of video data out_nmc(−1) in the non-MC filter 524 as described with respect to, for example FIG. 4B. In this regard, the first picture of video data In(0) may be blended with the motion compensated or the non-motion compensated previously generated output picture of video data, out(−1) or out_nmc(−1), based on the corresponding comparison. Furthermore, a blending factor that may be utilized by the non-MC filter 524, may be shifted based on the comparison. The shifted blending factor may, for example, enable a reduction in motion trail artifacts in the non-motion compensated blended first picture of video data with the motion compensated previously generated output of picture or in the non-motion compensated blended first picture of video data with the non-motion compensated previously generated output of picture of video data.

A blending factor, for example, output from the blend calculation block 530 may be determined for blending by the blend block 528, the blended first picture of video data In(0) and a corresponding motion compensated previously generated output picture of the video data, MCout, with the blended first picture of the video data In(0) and the non-motion compensated previously generated output picture of the video data, non-MCout, for example. The determined blending factor may be utilized when blending the blended pictures of video data comprising MCout and non-MCout shown in FIGS. 4A-4C.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for mitigating motion trail artifacts and improving low contrast contours in temporal filtering based noise reduction.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
    performing by one or more processors, one or more circuits, or any combination thereof:
        comparing a partitioned window of picture data from a picture of video data with a corresponding motion compensated partitioned window of picture data from a motion compensated previously generated output picture of said video data;
        blending said picture, using said shifted blending factor, with said motion compensated previously generated output picture to generate a motion compensated blended picture; and
        generating a current output picture of said video data utilizing said motion compensated blended picture and a corresponding non-motion compensated blended picture of said video data.

2. The method according to claim 1, further comprising comparing said partitioned window of picture data from said picture of said video data with a corresponding non-motion compensated partitioned window of picture data from said motion compensated previously generated output picture or from a non-motion compensated previously generated output picture of said video data.

3. The method according to claim 2, further comprising blending said picture of said video data with said motion compensated previously generated output picture or with said non-motion compensated previously generated output picture based on said comparison with said corresponding non-motion compensated partitioned window to generate said corresponding non-motion compensated blended picture.

4. The method according to claim 3, further comprising shifting another blending factor for said blending to generate said corresponding non-motion compensated blended picture, said shifting based on said comparison with said corresponding non-motion compensated partitioned window.

5. The method according to claim 2, further comprising partitioning said corresponding non-motion compensated partitioned window of picture data from said motion compensated previously generated output picture of said video data or from said non-motion compensated previously generated output picture of said video data.

6. The method according to claim 1, further comprising blending, utilizing another blending factor, said motion compensated blended picture and said corresponding non-motion compensated blended picture.

7. The method according to claim 6, further comprising determining said other blending factor for blending said motion compensated blended picture with said corresponding non-motion compensated blended picture.

8. The method according to claim 1, further comprising partitioning said partitioned window from said picture of said video data.

9. The method according to claim 1, further comprising partitioning said corresponding motion compensated partitioned window from said motion compensated previously generated output picture of said video data.

10. The method according to claim 1, further comprising generating said corresponding non-motion compensated blended picture of said video data utilizing a non-motion compensated partitioned window of said picture data.

11. A system for processing video, the system comprising:
    one or more processors, one or more circuits, or any combination thereof that are operable to:
        compare a partitioned window of picture data from a picture of video data with a corresponding partitioned window of picture data from a motion compensated previously generated output picture of said video data;
        shift a blending factor based on said comparison;
        blend, using said shifted blending factor, said picture of said video data with said motion compensated previously generated output picture to generate a motion compensated blended picture; and
        generate a current output picture of said video data utilizing said motion compensated blended picture and a corresponding non-motion compensated blended picture of said video data.

12. The system according to claim 11, wherein said one or more processors, said one or more circuits, or said combination thereof are operable to compare said partitioned widow of picture data from said first picture of said video data with a corresponding non-motion compensated partitioned window of picture data from said motion compensated previously generated output picture or from a non-motion compensated previously generated output picture of said video data.

13. The system according to claim 12, wherein said one or more processors, said one or more circuits, or said combination thereof are operable to blend said picture of said video data with said motion compensated previously generated output picture or with said non-motion compensated previously generated output picture based on said comparison with said corresponding non-motion compensated partitioned window to generate said corresponding non-motion compensated blended picture.

14. The system according to claim 13, wherein said one or more processors, said one or more circuits, or said combination thereof are operable to shift another blending factor for said blending to generate said corresponding non-motion compensated blended picture, said shifting based on said comparison with said corresponding non-motion compensated partitioned window.

15. The system according to claim 12, wherein said one or more processors, said one or more circuits, or said combination thereof are operable to partition a non-motion compensated window of picture data from said motion compensated previously generated output picture of said video data or from said non-motion compensated previously generated output picture of said video data.

16. The system according to claim 11, wherein said one or more processors, said one or more circuits, or said combination thereof are operable to blend, utilizing another blending factor, said motion compensated blended picture and said corresponding non-motion compensated blended picture.

17. The system according to claim 16, wherein said one or more processors, said one or more circuits, or said combination thereof are operable to determine said other blending factor for blending said motion compensated blended picture with said corresponding non-motion compensated blended picture.

18. The system according to claim 11, wherein said one or more processors, said one or more circuits, or said combination thereof are operable to partition said partitioned window from said picture of said video data.

19. The system according to claim 11, wherein said one or more processors, said one or more circuits, or said combination thereof are operable to partition said corresponding motion compensated partitioned window from said motion compensated previously generated output picture of said video data.

20. The system according to claim 11, wherein said one or more processors, said one or more circuits, or said combination thereof are operable to generate said corresponding non-motion compensated blended picture of said video data utilizing a non-motion compensated partitioned window of said picture data.

21. A non-transitory machine readable storage medium, having stored thereon a program that, when executed by processing circuitry, causes said processing circuitry to:

compare a partitioned window of picture data from a picture of video data with a corresponding partitioned window of picture data from a motion compensated previously generated output picture of said video data;

shift a blending factor based on said comparison;

blend, using said shifted blending factor, said picture of said video data with said motion compensated previously generated output picture to generate a motion compensated blended picture; and generate a current output picture of said video data utilizing said motion compensated blended picture and a corresponding non-motion compensated blended picture of said video data.

22. The non-transitory machine readable storage medium according to claim 21, wherein said program causes said processing circuitry to generate said corresponding non-motion compensated blended picture of said video data utilizing a non-motion compensated partitioned window of said picture data.

23. The non-transitory machine readable storage medium according to claim 21, wherein said program causes said processing circuitry to blend, utilizing another blending factor, said motion compensated blended picture and said corresponding non-motion compensated blended picture.

24. The non-transitory machine readable storage medium according to claim 21, wherein said program causes said processing circuitry to blend said picture of said video data with said motion compensated previously generated output picture or with a non-motion compensated previously generated output picture, based on a comparison of said partitioned window of picture data from said picture of said video data with a corresponding partitioned non-motion compensated window of picture data from said motion compensated previously generated output picture or from a non-motion compensated previously generated output picture of said video data, to generate said corresponding non-motion compensated blended picture.

* * * * *